United States Patent
Tanemura

(10) Patent No.: US 10,649,600 B1
(45) Date of Patent: May 12, 2020

(54) SINGLE LAYER SENSOR ARRAY SCAN

(71) Applicant: SYNAPTICS INCORPORATED, San Jose, CA (US)

(72) Inventor: Tetsuo Tanemura, Tokyo (JP)

(73) Assignee: SYNAPTICS INCORPORATED, San Jose, CA (US)

( * ) Notice: Subject to any disclaimer, the term of this patent is extended or adjusted under 35 U.S.C. 154(b) by 25 days.

(21) Appl. No.: 16/172,783

(22) Filed: Oct. 27, 2018

(51) Int. Cl.
*G06F 3/044* (2006.01)
*G06F 3/041* (2006.01)

(52) U.S. Cl.
CPC ............ *G06F 3/044* (2013.01); *G06F 3/0412* (2013.01); *G06F 3/0416* (2013.01); *G06F 2203/04108* (2013.01)

(58) Field of Classification Search
CPC ...... G06F 1/3215; G06F 1/324; G06F 1/3262; G06F 3/0416; G06F 3/044; G06F 2203/04101
See application file for complete search history.

(56) References Cited

U.S. PATENT DOCUMENTS

| | | | |
|---|---|---|---|
| 2015/0261251 A1* | 9/2015 | Shepelev | G06F 3/044 345/174 |
| 2016/0162011 A1* | 6/2016 | Verma | G06F 3/0416 345/173 |
| 2018/0088706 A1 | 3/2018 | Tanemura et al. | |

* cited by examiner

*Primary Examiner* — Nelson M Rosario
(74) *Attorney, Agent, or Firm* — Patterson + Sheridan, LLP

(57) ABSTRACT

A method of performing a scan of a sensor array is disclosed, as well as an associated processing system and input device. The sensor array comprises a plurality of sensor electrodes in a single layer. A plurality of routing traces is arranged in the single layer. The method comprises, for each sensor electrode of the plurality of sensor electrodes, acquiring, during a first period, an absolute capacitive measurement for the sensor electrode. The method further comprises, for each bordering sensor electrode of one or more bordering sensor electrodes of the plurality of sensor electrodes, acquiring, during a second period, a transcapacitive measurement between the sensor electrode and the bordering sensor electrode.

17 Claims, 9 Drawing Sheets

SINGLE LAYER SENSOR ARRAY SCAN

BACKGROUND

Field

Embodiments disclosed herein generally relate to electronic devices, and more specifically, techniques for scanning a sensor array implemented in a single layer.

Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY

One embodiment described herein is an input device comprising a sensor array comprising a plurality of sensor electrodes in a single layer of the input device. Each sensor electrode of the plurality of sensor electrodes is bordered by one or more bordering sensor electrodes of the plurality of sensor electrodes. The input device further comprises a plurality of routing traces arranged in the single layer, and a processing system coupled with the plurality of sensor electrodes via the plurality of routing traces. The processing system is configured to perform a scan of the sensor array by (1) operating each sensor electrode of the plurality of sensor electrodes to acquire, during a first period, an absolute capacitive measurement for the sensor electrode, and (2) for each bordering sensor electrode of the one or more bordering sensor electrodes, acquire, during a second period, a transcapacitive measurement between the sensor electrode and the bordering sensor electrode.

Another embodiment described herein is a processing system comprising sensing circuitry configured to couple with a sensor array via a plurality of routing traces. The sensor array comprises a plurality of sensor electrodes in a single layer. Each sensor electrode of the plurality of sensor electrodes is bordered by one or more bordering sensor electrodes of the plurality of sensor electrodes. The plurality of routing traces is arranged in the single layer. The circuitry is further configured to perform a scan of the sensor array by operating each sensor electrode of the plurality of sensor electrodes to (1) acquire, during a first period, an absolute capacitive measurement for the sensor electrode, and (2) for each bordering sensor electrode of the one or more bordering sensor electrodes, acquire, during a second period, a transcapacitive measurement between the sensor electrode and the bordering sensor electrode.

Another embodiment described herein is a method of performing a scan of a sensor array of an input device. The sensor array comprises a plurality of sensor electrodes in a single layer of the input device. The input device further comprises a plurality of routing traces arranged in the single layer. The method comprises, for each sensor electrode of the plurality of sensor electrodes, acquiring, during a first period, an absolute capacitive measurement for the sensor electrode. The method further comprises, for each bordering sensor electrode of one or more bordering sensor electrodes of the plurality of sensor electrodes, acquiring, during a second period, a transcapacitive measurement between the sensor electrode and the bordering sensor electrode.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments, and are therefore not to be considered limiting of inventive scope, as the disclosure may admit to other equally effective embodiments.

Figure 1:
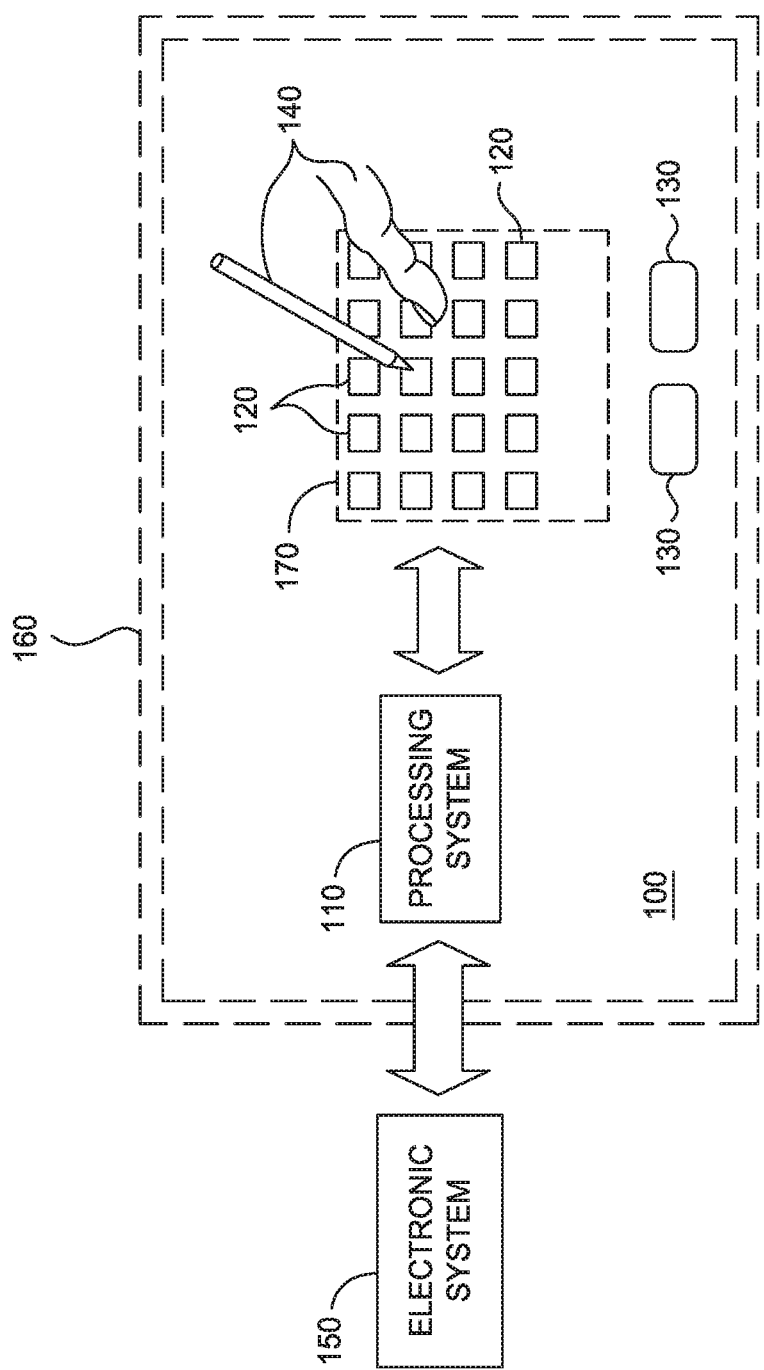
FIG. 1 is a schematic block diagram of an input device, according to embodiments described herein.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the disclosure or the application and uses of the disclosure. Furthermore, there is no intention to be bound by any expressed or implied theory presented in the preceding background, summary, or the following detailed description.

Various embodiments of the present disclosure provide input devices and methods for improving usability. An input device may include electrodes that are operated as sensor electrodes to detect interaction between the input device and an input object (e.g., a stylus or a user's finger). The input device generally drives sensing signals onto the sensor electrodes to acquire capacitive measurements and/or force measurements corresponding to a sensing region.

Sensor arrays with fewer sensor electrodes may be employed in low-cost devices or in smaller devices such as body-wearable devices. Using techniques described herein, the sensor array may have an increased sensing performance (e.g., increased active area or increased sensor resolution) despite a small number of sensor electrodes, without requiring complex arrangements of the sensor electrodes and routing traces. In some embodiments, the sensor electrodes and routing traces are arranged in a single layer. Notably, the techniques described herein may be extended to sensor arrays of any arrangement and size.

Exemplary Input Device Implementations

FIG. 1 is a schematic block diagram of an input device 100, in accordance with embodiments of the present technology. In various embodiments, input device 100 comprises a display device integrated with a sensing device. The input device 100 may be configured to provide input to an electronic system 150. As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Example communication protocols include Inter-Integrated Circuit (I$^2$C), Serial Peripheral Interface (SPI), Personal System/2 (PS/2), Universal Serial Bus (USB), Bluetooth®, Radio Frequency (RF), and Infrared Data Association (IrDA) communication protocols.

In FIG. 1, the input device 100 is shown as a proximity sensor device (also often referred to as a "touchpad" or a "touch sensor device") configured to sense input provided by one or more input objects 140 in a sensing region 170. Example input objects include fingers and styli, as shown in FIG. 1.

Sensing region 170 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 170 extends from a surface of the input device 100 in one or more directions into space until signal-to-noise ratios prevent sufficiently accurate object detection. The distance to which this sensing region 170 extends in a particular direction, in various embodiments, may be on the order of less than a millimeter, millimeters, centimeters, or more, and may vary significantly with the type of sensing technology used and the accuracy desired. Thus, in some embodiments, sensing input may comprise no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 170 has a rectangular shape when projected onto an input surface of the input device 100.

The input device 100 may utilize any combination of sensor components and sensing technologies to detect user input in the sensing region 170. The input device 100 comprises a plurality of sensor electrodes 120 for detecting user input. The input device 100 may include one or more sensor electrodes 120 that are combined to form sensor electrodes. As several non-limiting examples, the input device 100 may use capacitive, elastive, resistive, inductive, magnetic acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensor electrodes 120 pickup loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensor electrodes 120 to create electric fields. In some capacitive implementations, separate sensor electrodes 120 may be ohmically shorted together to form larger sensor electrodes. Some capacitive implementations utilize resistive sheets, which may be uniformly resistive.

As discussed above, some capacitive implementations utilize "self-capacitance" (or "absolute capacitance") sensing methods based on changes in the capacitive coupling between sensor electrodes 120 and an input object. In one embodiment, processing system 110 is configured to drive a voltage with known amplitude onto the sensor electrode 120 and measure the amount of charge required to charge the sensor electrode to the driven voltage. In other embodiments, processing system 110 is configured to drive a known current and measure the resulting voltage. In various embodiments, an input object near the sensor electrodes 120 alters the electric field near the sensor electrodes 120, thus changing the measured capacitive coupling. In one implementation, an absolute capacitance sensing method operates by modulating sensor electrodes 120 with respect to a reference voltage (e.g. system ground) using a modulated signal, and by detecting the capacitive coupling between the sensor electrodes 120 and input objects 140.

Additionally as discussed above, some capacitive implementations utilize "mutual capacitance" (or "transcapacitance") sensing methods based on changes in the capacitive coupling between sensing electrodes. In various embodiments, an input object 140 near the sensing electrodes alters the electric field between the sensing electrodes, thus changing the measured capacitive coupling. In one implementation, a transcapacitive sensing method operates by detecting the capacitive coupling between one or more transmitter sensing electrodes (also "transmitter electrodes") and one or more receiver sensing electrodes (also "receiver electrodes") as further described below. Transmitter sensing electrodes may be electrically modulated relative to a reference voltage (e.g., system ground) to transmit a transmitter signals. Receiver sensing electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensing electrodes may be dedicated transmitter electrodes or receiver electrodes, or may be configured to both transmit and receive.

In FIG. 1, the processing system 110 is shown as part of the input device 100. The processing system 110 is configured to operate the hardware of the input device 100 to detect input in the sensing region 170. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes. In some embodiments, the processing system 110 also comprises electronically-readable instructions, such as firmware code, software code, and/or the like. In some embodiments, components composing the processing system 110 are located together, such as near sensor electrode(s) 120 of the input device 100. In other embodiments, components of processing system 110 are physically separate with one or more components close to sensor electrode(s) 120 of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a mobile device such as a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensor electrodes 120 to detect input, identification modules configured to identify gestures such as mode changing gestures, and mode changing modules for changing operation modes. Processing system 110 may also comprise one or more controllers.

In some embodiments, the processing system 110 responds to user input (or lack of user input) in the sensing region 170 directly by causing one or more actions. Example actions include changing operation modes, as well as graphical user interface (GUI) actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensor electrode(s) 120 of the input device 100 to produce electrical signals indicative of input (or lack of input) in the sensing region 170. The processing system 110 may perform any appropriate amount of processing on the electrical signals in producing the information provided to the electronic system. For example, the processing system 110 may digitize analog electrical signals obtained from the sensor electrodes 120. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 170, or some other functionality. FIG. 1 shows buttons 130 near the sensing region 170 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 170 overlaps at least part of an active area of a display screen of the display device 160. For example, the input device 100 may comprise substantially transparent sensor electrodes 120 overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display device 160 may share physical elements. For example, some embodiments may utilize some of the same electrical components for displaying and sensing. As another example, the display device 160 may be operated in part or in total by the processing system 110.

It should be understood that while many embodiments of the present technology are described in the context of a fully functioning apparatus, the mechanisms of the present technology are capable of being distributed as a program product (e.g., software) in a variety of forms. For example, the mechanisms of the present technology may be implemented and distributed as a software program on information bearing media that are readable by electronic processors (e.g., non-transitory computer-readable and/or recordable/writable information bearing media readable by the processing system 110). Additionally, the embodiments of the present technology apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Exemplary Sensor Electrode Implementations

Figure 2:
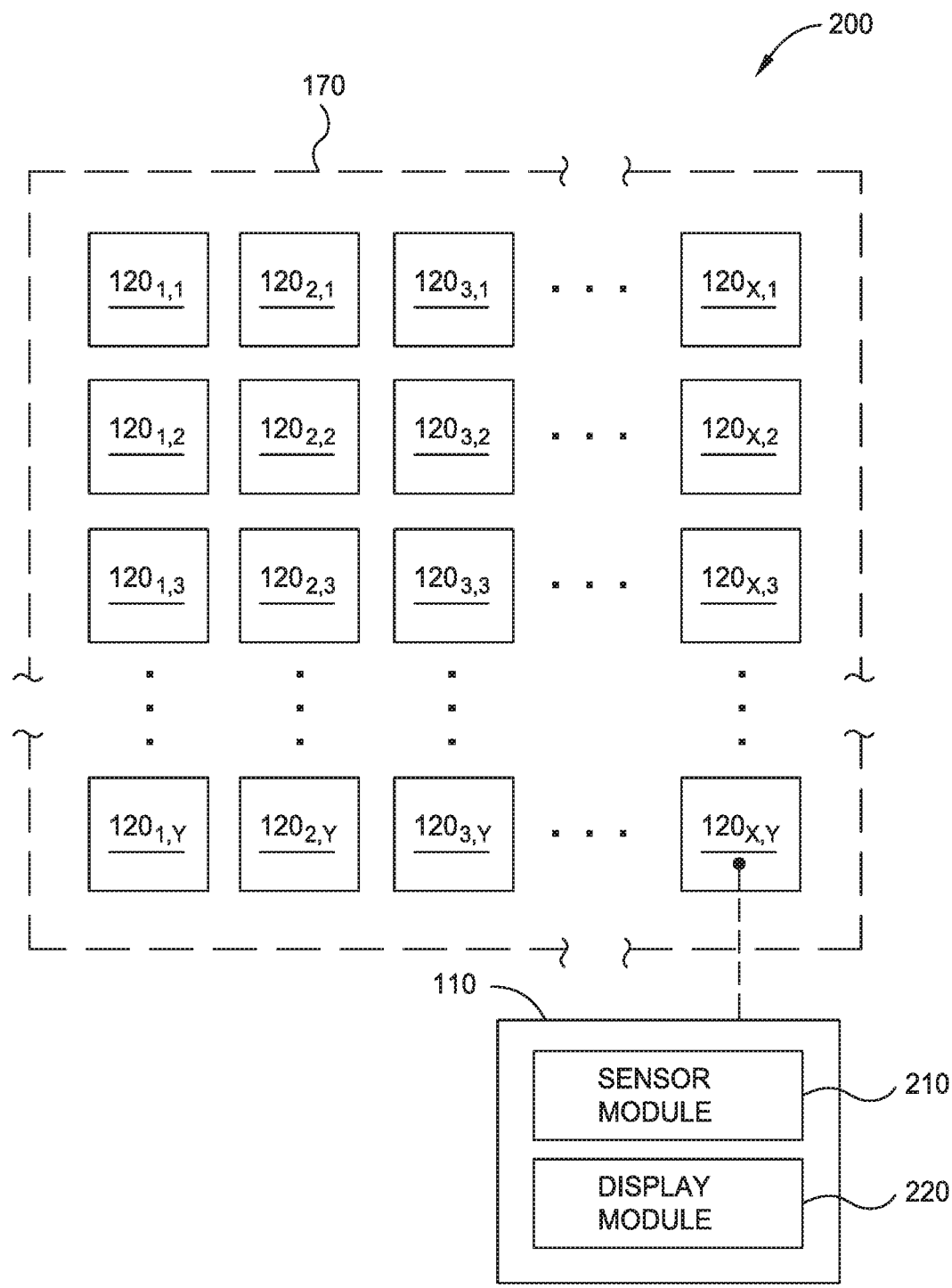
FIG. 2 illustrates a portion of an exemplary sensor electrode implementation, according to embodiments described herein.

FIG. 2 illustrates a portion of an exemplary sensor electrode arrangement, according to embodiments described herein. Specifically, arrangement 200 illustrates a portion of a pattern of sensor electrodes configured to sense in a sensing region 170 associated with the pattern, according to several embodiments. For clarity of illustration and description, FIG. 2 shows the sensor electrodes in a pattern of simple rectangles, and does not show various associated components. The pattern of sensing electrodes comprises a plurality of sensor electrodes 120.

The arrangement 200 of FIG. 2 illustrates a portion of a sensor array comprising a plurality of sensor electrodes 120 (i.e., sensor electrodes $120_{1,1}$, $120_{2,1}$, ..., $120_{X,Y}$) configured to sense in the sensing region 170, according to several embodiments. The plurality of sensor electrodes 120 is typically ohmically isolated from each other. That is, one or more insulators separate different ones of the plurality of sensor electrodes 120, preventing them from electrically shorting to each other. In some embodiments, the plurality of sensor electrodes 120 is disposed in a single (common) layer. Although not shown, conductive routing traces in the single layer may extend through interstices (or gaps) existing between the plurality of sensor electrodes 120.

The pluralities of sensor electrodes 120 may be formed into any desired shapes. Moreover, the size and/or shape of some of the sensor electrodes 120 may be different than the size and/or shape of other ones of the sensor electrodes 120. In some embodiments, the plurality of sensor electrodes 120 may have a similar size and/or shape.

In some embodiments, the plurality of sensor electrodes 120 is located outside of a plurality (or display stack) of layers that together form the display device 160. One example of a display stack may include layers such as a lens layer, a one or more polarizer layers, a color filter layer, one or more display electrodes layers, a display material layer, a thin-film transistor (TFT) glass layer, and a backlight layer. However, other implementations of a display stack are possible. In other embodiments, the plurality of sensor electrodes 120 is located within the display stack, whether included as part of a display-related layer or a separate layer. For example, common electrodes (Vcom) within a particular display electrode layer can be configured to perform both display updating and capacitive sensing.

For clarity of illustration and description, the arrangement 200 shows the plurality of sensor electrodes 120 as a pattern of simple rectangles and does not show other associated components. The plurality of sensor electrodes $120_{1,1}$, $120_{2,1}$, ..., $120_{X,Y}$ is arranged in X columns and Y rows, wherein X and Y are positive integers, although one of X and Y may be zero. It is contemplated that the pattern of the plurality of sensor electrodes 120 may have other configurations, such as polar arrays, repeating patterns, non-repeating patterns, a single row or column, or other suitable implementation. Further, in various embodiments the number of the plurality of sensor electrodes 120 may vary from row to row and/or column to column. In one embodiment, at least one row and/or column of sensor electrodes 120 is offset from the others, such that row and/or column of sensor electrodes 120 extends further in at least one direction than other row(s) and/or column(s) of sensor electrodes. The plurality of sensor electrodes 120 is coupled to the processing system 110 and utilized to determine the presence (or lack thereof) of an input object in the sensing region 170.

In a first mode of operation, the plurality of sensor electrodes 120 may be utilized to detect the presence of an input object via absolute sensing techniques. That is, the processing system 110 is configured to drive the plurality of sensor electrodes 120 with modulated signal(s) to acquire measurements of changes in capacitive coupling between the plurality of sensor electrodes 120 and an input object to determine the position of the input object. The processing system 110 is further configured to determine changes of absolute capacitance based on a measurement of resulting signals received with the plurality of sensor electrodes 120 which have been driven with the modulated signal(s).

In some embodiments, the arrangement 200 includes one or more grid electrodes (not shown) that are disposed between at least two of the plurality of sensor electrodes 120. The grid electrode(s) may at least partially circumscribe the plurality of sensor electrodes 120 as a group, and may also, or in the alternative, completely or partially circumscribe one or more of the sensor electrodes 120. In one embodiment, the grid electrode(s) is a planar body having a plurality of apertures, where each aperture circumscribes a respective one of the sensor electrodes 120. In other embodiments, the grid electrode(s) comprise a plurality of segments that may be driven individually or in groups or two or more segments. The grid electrode(s) may be fabricated similar to the plurality of sensor electrodes 120. The grid electrode(s), along with the plurality of sensor electrodes 120, may be coupled to the processing system 110 utilizing conductive routing traces and used for input object detection.

As mentioned above, the plurality of sensor electrodes 120 are typically ohmically isolated from each other, and are also ohmically isolated from the grid electrode(s). That is, one or more insulators separate the plurality of sensor electrodes 120 and grid electrode(s), prevent them from electrically shorting to each other. In some embodiments, the plurality of sensor electrodes 120 and grid electrode(s) are separated by an insulative gap, which may be filled with an electrically insulating material, or which may be an air gap.

In a second mode of operation, the plurality of sensor electrodes 120 may be utilized to detect the presence of an input object via transcapacitive sensing techniques when a modulated signal (or transmitter signal) is driven onto the grid electrode(s). That is, the processing system 110 is configured to drive the grid electrode(s) with a transmitter signal and to receive resulting signals with each of the plurality of sensor electrodes 120, where a resulting signal comprising effects corresponding to the transmitter signal, which is utilized by the processing system 110 or other processor to determine the position of the input object.

In a third mode of operation, the plurality of sensor electrodes 120 may be divided into, and operated as, groups of transmitter electrodes and receiver electrodes utilized to detect the presence of an input object via transcapacitive sensing techniques. That is, the processing system 110 may drive a first group of the plurality of sensor electrodes 120 with modulated signal(s) (or transmitter signal(s)) and receive resulting signals with a second group of the plurality of sensor electrodes 120, where the resulting signals comprise effects corresponding to the modulated signal(s). The resulting signals are utilized by the processing system 110 or other processor to determine the position of the input object.

The input device 100 may be configured to operate in any one of the modes described above. The input device 100 may also be configured to switch between any two or more of the modes described above.

The areas of localized capacitive sensing of capacitive couplings may be termed "capacitive pixels," "touch pixels," "tixels," etc. Capacitive pixels may be formed between an individual sensor electrode 120 and a reference voltage in the first mode of operation, between the sensor electrodes 120 and grid electrode(s) in the second mode of operation, and between different groups of sensor electrodes 120 operated as transmitter electrodes and receiver electrodes. The capacitive coupling changes with the proximity and motion of input objects in the sensing region 170 associated with the plurality of sensor electrodes 120, and thus may be used as an indicator of the presence of the input object in the sensing region of the input device 100.

In some embodiments, the plurality of sensor electrodes 120 is "scanned" to determine these capacitive couplings. That is, in one embodiment, one or more of the plurality of sensor electrodes 120 are driven as transmitter electrodes with modulated signals. The transmitter electrodes may be operated such that one transmitter electrode transmits at one time, or such that multiple transmitter electrodes transmit at the same time. Where multiple transmitter electrodes transmit simultaneously, the multiple transmitter electrodes may transmit a same transmitter signal and thereby produce an effectively larger transmitter electrode. Alternatively, the multiple transmitter electrodes may transmit different transmitter signals. For example, multiple transmitter electrodes may transmit different transmitter signals according to one or more coding schemes that enable their combined effects on the resulting signals of receiver electrodes to be independently determined. In one embodiment, multiple transmitter electrodes may simultaneously transmit the same transmitter signal while the receiver electrodes receive the effects and are measured according to a scanning scheme.

One or more of the plurality of sensor electrodes 120 when configured as receiver electrodes may be operated singly or multiply to acquire resulting signals. The resulting signals may be used to determine measurements of the capacitive couplings at the capacitive pixels. The processing system 110 may be configured to receive with the plurality of sensor electrodes 120 in a scanning fashion and/or a multiplexed fashion to reduce the number of simultaneous measurements to be made, as well as the size of the supporting electrical structures. In one embodiment, one or more of the plurality of sensor electrodes 120 are coupled to a receiver of the processing system 110 via a switching element such as a multiplexer or the like. In such an embodiment, the switching element may be internal to the processing system 110 or external to the processing system 110. In one or more embodiments, the switching elements may be further configured to couple a particular one of the plurality of sensor electrodes 120 with a transmitter or with another signal and/or voltage potential. In one embodiment, the switching element may be configured to couple more than one receiver electrode to a common receiver at the same time.

In other embodiments, "scanning" the plurality of sensor electrodes 120 to determine these capacitive couplings comprises modulating one or more of the plurality of sensor electrodes 120 and measuring an absolute capacitance of the one or more sensor electrodes 120. In another embodiment, the plurality of sensor electrodes 120 may be operated such that more than one sensor electrode is driven and received with at a time. In such embodiments, absolute capacitive measurements may be obtained from each of the one or more sensor electrodes 120 at least partly overlapping in time. In one embodiment, each of the sensor electrodes 120 are simultaneously (or contemporaneously) driven and received with, obtaining an absolute capacitive measurement simultaneously from each of the sensor electrodes 120. In various embodiments, the processing system 110 may be configured to selectively modulate a portion of the sensor electrodes 120. For example, the portion of the sensor electrodes 120 may be selected based on, but not limited to, an application running on the host processor, a status of the input device, and an operating mode of the input device. In various embodiments, the processing system 110 may be configured to selectively shield at least a portion of the sensor electrodes 120 and to selectively shield or transmit with the grid electrode(s) while selectively receiving and/or transmitting with other ones of the sensor electrodes 120.

A set of measurements from the capacitive pixels form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region 170.

In any of the above embodiments, multiple sensor electrodes 120 may be ganged together such that the sensor electrodes 120 are simultaneously modulated or simultaneously received with. As compared to the methods described above, ganging together multiple sensor electrodes 120 may produce a coarse capacitive image with insufficient resolution to discern precise positional information of an input object. However, the coarse capacitive image may be used to sense presence of an input object. In one embodiment, the coarse capacitive image may be used to move the processing system 110 or the input device 100 out of a "doze" mode or low-power mode. In one embodiment, the coarse capacitive image may be used to move a capacitive sensing IC out of a "doze" mode or low-power mode. In another embodiment, the coarse capacitive image may be used to move at least one of a host IC and/or a display driver out of a "doze" mode or low-power mode. The coarse capacitive image may correspond to the entire sensing region 170 or only to a portion of the sensing region 170.

A background capacitance of the input device 100 represents a capacitive image associated with no input object in the sensing region 170. The background capacitance changes with the environment and operating conditions, and may be estimated in various ways. For example, some embodiments take "baseline images" when no input object is determined to be in the sensing region 170, and use those baseline images as estimates of their background capacitances. The background capacitance or the baseline capacitance may be present due to stray capacitive coupling between two sensor electrodes 120, where one sensor electrode 120 is driven with a modulated signal and the other sensor electrode 120 is held stationary relative to system ground, or due to stray capacitive coupling between a receiver electrode and nearby modulated electrodes. In many embodiments, the background or baseline capacitance may be relatively stationary over the time period of a user input gesture.

Capacitive images can be adjusted for the background capacitance of the input device 100 for more efficient processing. Some embodiments accomplish this by "baselining" measurements of the capacitive couplings at the capacitive pixels to produce a "baselined capacitive image." That is, some embodiments compare the measurements forming a capacitance image with appropriate "baseline values" of a "baseline image" associated with those pixels, and determine changes from that baseline image.

In some touch screen embodiments, one or more of the sensor electrodes 120 comprise one or more display electrodes used in updating the display of the display screen. The display electrodes may comprise one or more elements of an active matrix display, such as one or more segments of a segmented Vcom electrode (common electrode(s)), a source drive line, a gate line, an anode sub-pixel electrode or cathode pixel electrode, or any other suitable display element. These display electrodes may be disposed on an appropriate display screen substrate. For example, the common electrodes may be disposed on a transparent substrate (a glass substrate, TFT glass, or any other transparent material) in some display screens (e.g., In-Plane Switching (IPS), Fringe Field Switching (FFS) or Plane to Line Switching (PLS) Organic Light Emitting Diode (OLED)), on the bottom of the color filter glass of some display screens (e.g., Patterned Vertical Alignment (PVA) or Multi-domain Vertical Alignment (MVA)), over an emissive layer (OLED), etc. In such embodiments, the display electrode can also be referred to as a "combination electrode," since it performs multiple functions. In various embodiments, each of the sensor electrodes 120 comprises one or more common electrodes. In other embodiments, at least two sensor electrodes 120 may share at least one common electrode. While the following description may describe that sensor electrodes 120 and/or grid electrode(s) comprise one or more common electrodes, various other display electrodes as describe above may also be used in conjunction with the common electrode or as an alternative to the common electrodes. In various embodiments, the sensor electrodes 120 and grid electrode(s) comprise the entire common electrode layer (Vcom electrode).

In various touch screen embodiments, the "capacitive frame rate" (the rate at which successive capacitive images are acquired) may be the same or be different from that of the "display frame rate" (the rate at which the display image is updated, including refreshing the screen to redisplay the same image). In various embodiments, the capacitive frame rate is an integer multiple of the display frame rate. In other embodiments, the capacitive frame rate is a fractional multiple of the display frame rate. In yet further embodiments, the capacitive frame rate may be any fraction or integer multiple of the display frame rate. In one or more embodiments, the display frame rate may change (e.g., to reduce power or to provide additional image data such as a 3D display information) while a touch frame rate maintains constant. In other embodiments, the display frame rate may remain constant while the touch frame rate is increased or decreased.

Continuing to refer to FIG. 2, the processing system 110 coupled to the plurality of sensor electrodes 120 includes a sensor module 210 and optionally a display module 220. The sensor module 210 includes circuitry configured to drive at least one of the sensor electrodes 120 for capacitive sensing during periods in which input sensing is desired. In one embodiment, the sensor module 210 is configured to drive a modulated signal onto the at least one sensor electrode 120 to detect changes in absolute capacitance between the at least one sensor electrode and an input object. In another embodiment, the sensor module 210 is configured to drive a transmitter signal onto at least one sensor electrode 120 to detect changes in a transcapacitance between the at least one sensor electrode 120 and another sensor electrode 120. The modulated and transmitter signals are generally varying voltage signals comprising a plurality of voltage transitions over a period of time allocated for input sensing. In various embodiments, the sensor electrodes 120 and/or grid electrode(s) may be driven differently in different modes of operation. In one embodiment, the sensor electrodes 120 and/or grid electrode(s) may be driven with signals (modulated signals, transmitter signals and/or shield signals) that may differ in any one of phase, amplitude, and/or shape. In various embodiments, the modulated signal and transmitter signal are similar in at least one shape, frequency, amplitude, and/or phase. In other embodiments, the modulated signal and the transmitter signals are different in frequency, shape, phase, amplitude, and phase. The sensor module 210 may be selectively coupled with one or more of the sensor electrodes 120 and/or the grid electrode(s). For example, the sensor module 210 may be coupled to selected portions of the plurality of sensor electrodes 120 and operate in either an absolute or transcapacitive sensing mode. In another example, the sensor module 210 may be coupled to all of the plurality of sensor electrodes 120 and operate in either an absolute or transcapacitive sensing mode.

In some embodiments, the sensor module 210 is configured to operate the grid electrode(s) as a shield electrode that "shield" particular sensor electrodes 120 from the electrical effects of nearby conductors, and/or to guard the sensor electrodes 120 from grid electrode(s), which at least partially reduces a parasitic capacitance between the grid electrode(s) and the sensor electrodes 120. In one embodiment, a shielding signal is driven onto the grid electrode(s). The shielding signal may be a ground signal, such as the system ground or other ground, or any other constant voltage (i.e., non-modulated) signal. In another embodiment, operating the grid electrode(s) as a shield electrode may comprise electrically floating the grid electrode. In one embodiment, grid electrode(s) are able to operate as an effective shield electrode while being electrode floated due to its large coupling to the other sensor electrodes. In other embodiment, the shielding signal may be referred to as a "guarding signal" where the guarding signal is a varying voltage signal having at least one of a similar phase, frequency, and amplitude as the modulated signal driven on to the sensor electrodes. In one or more embodiment, routing traces may be shielded from responding to an input object due to routing beneath the grid electrode(s) and/or sensor electrodes 120, and therefore may not be part of the active sensor electrodes, shown as sensor electrodes 120.

In one or more embodiments, capacitive sensing (or input sensing) and display updating may occur during at least partially overlapping periods. For example, as a common electrode is driven for display updating, the common electrode may also be driven for capacitive sensing. In another embodiment, capacitive sensing and display updating may occur during non-overlapping periods, also referred to as non-display update periods. In various embodiments, the non-display update periods may occur between display line update periods for two display lines of a display frame and may be at least as long in time as the display update period. In such embodiments, the non-display update period may be referred to as a "long horizontal blanking period," "long h-blanking period" or a "distributed blanking period," where the blanking period occurs between two display updating periods and is at least as long as a display update period. In one embodiment, the non-display update period occurs between display line update periods of a frame and is long enough to allow for multiple transitions of the transmitter signal to be driven onto the sensor electrodes 120. In other embodiments, the non-display update period may comprise horizontal blanking periods and vertical blanking periods. The processing system 110 may be configured to drive the sensor electrodes 120 for capacitive sensing during any one or more of or any combination of the different non-display update times. Synchronization signals may be shared between sensor module 210 and display module 220 to provide accurate control of overlapping display updating and capacitive sensing periods with repeatably coherent frequencies and phases. In one embodiment, these synchronization signals may be configured to allow the relatively stable voltages at the beginning and end of the input sensing period to coincide with display update periods with relatively stable voltages (e.g., near the end of a input integrator reset time and near the end of a display charge share time). A modulation frequency of a modulated or transmitter signal may be at a harmonic of the display line update rate, where the phase is determined to provide a nearly constant charge coupling from the display elements to the receiver electrode, allowing this coupling to be part of the baseline image.

The sensor module 210 further includes circuitry configured to receive resulting signals with the sensor electrodes 120 and/or grid electrode(s) comprising effects corresponding to the modulated signals or the transmitter signals during periods in which input sensing is desired. The sensor module 210 may determine a position of the input object in the sensing region 170 or may provide a signal including information indicative of the resulting signal to another module or processor, for example, a determination module or a processor of an associated electronic device 150 (i.e., a host processor), for determining the position of the input object in the sensing region 170.

The display module 220 may be included in or separate from the processing system 110. The display module 220 includes circuitry configured to provide display image update information to the display of the display device 160 during non-sensing (e.g., display updating) periods.

In one embodiment, the processing system 110 comprises a first integrated controller comprising the display module 220 and at least a portion of the sensor module 210 (i.e., transmitter module and/or receiver module). In another embodiment, the processing system 110 comprises a first integrated controller comprising the display module 220 and a second integrated controller comprising the sensor module 210. In yet another embodiment, the processing system comprises a first integrated controller comprising display module 220 and a first portion of the sensor module 210 (e.g., one of a transmitter module and a receiver module) and a second integrated controller comprising a second portion of the sensor module 210 (e.g., the other one of the transmitter and receiver modules). In those embodiments comprising multiple integrated circuits, a synchronization mechanism may be coupled between them, configured to synchronize display updating periods, sensing periods, transmitter signals, display update signals, and the like.

Exemplary Techniques for Performing Scan of Sensor Array

Figure 3:
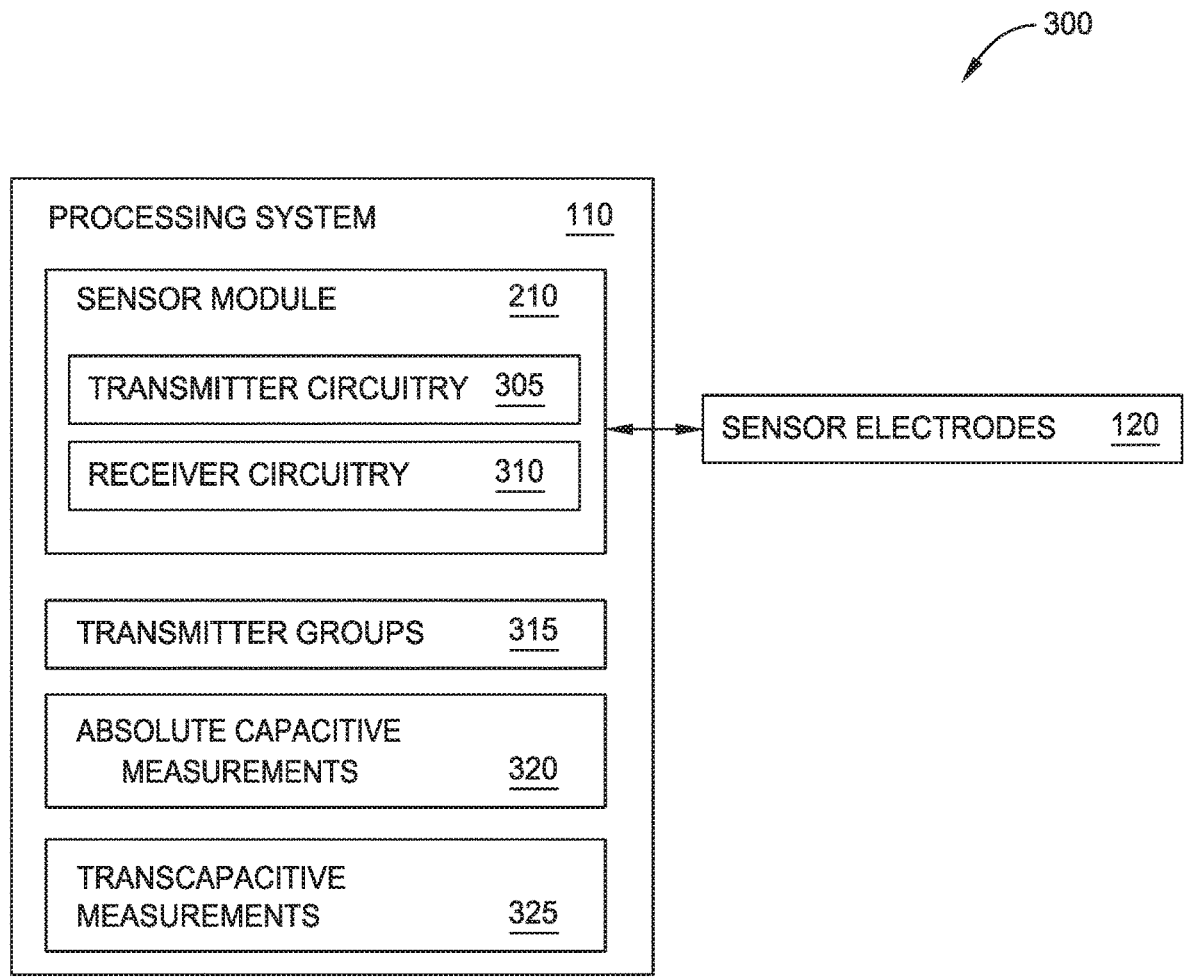
FIG. 3 is a diagram illustrating an exemplary processing system, according to embodiments described herein.

FIG. 3 is a diagram 300 illustrating an exemplary processing system 110, according to embodiments described herein. The features illustrated in the diagram 300 may be used in conjunction with other embodiments described herein. The sensor module 210 of the processing system 110 is coupled with the plurality of sensor electrodes 120. The sensor module 210 comprises transmitter circuitry 305 and receiver circuitry 310. Although the transmitter circuitry 305 and the receiver circuitry 310 are depicted as separate components, in other embodiments the transmitter circuitry 305 and the receiver circuitry 310 may have shared circuitry.

In some embodiments, the transmitter circuitry 305 comprises one or more sensor electrode transmitters that are configured to drive sensing signals (e.g., modulated signals) onto the plurality of sensor electrodes 120 for performing capacitive sensing, force sensing, etc. In some embodiments, the transmitter circuitry 305 comprises one or more guard amplifiers that are configured to drive guarding signals onto the plurality of sensor electrodes 120. In some embodiments, the transmitter circuitry 305 comprises one or more coarse background compensation (CBC) transmitters that are configured to mitigate a background capacitance of the plurality of sensor electrodes 120. Any suitable combination of components of the transmitter circuitry 305 is contemplated. Further, any other components that are configured to drive signals onto the plurality of sensor electrodes 120 to provide functionality to the sensor module 210 may be included in the transmitter circuitry 305.

In some embodiments, the receiver circuitry 310 comprises a plurality of analog front-ends (AFEs) that are each configured to acquire capacitive measurements, force measurements, etc. using the plurality of sensor electrodes 120. As discussed above, the receiver circuitry 310 may acquire absolute capacitive measurements 320 and transcapacitive measurements 325 using the plurality of sensor electrodes 120. In some embodiments, each AFE comprises an analog-to-digital converter (ADC) of any suitable type, such as a pipelined ADC, a successive approximation ADC, an integrating ADC, a sigma-delta ADC, and so forth. Each AFE may comprise other suitable circuitry for acquiring the various capacitive measurements, such as filtering circuitry or other signal conditioning circuitry (e.g., an amplifier). In some embodiments, each AFE includes a CBC capacitor that is used to mitigate a background capacitance of the sensor electrodes.

In some embodiments, the processing system 110 (or the sensor module 210) further comprises a plurality of transmitter groups 315 according to which the processing system 110 acquires the transcapacitive measurements 325 and/or the absolute capacitive measurements 320. Each of the plurality of transmitter groups 315 comprises one or more sensor electrodes 120 of the plurality of sensor electrodes 120.

Different transmitter group(s) of the plurality of transmitter groups 315 may be driven by the sensor module 210 at different times, according to a predefined sequence. In one non-limiting example, the sensor module 210 performs a scan of the sensor array by performing a process comprising (1) driving a first plurality of the transmitter groups 315 with a modulated signal during a first period, and (2) driving a second plurality of the transmitter groups 315 with a modulated signal during a second period. In some embodiments, each transmitter group of the first plurality of transmitter groups 315 and of the second plurality of transmitter groups 315 comprises a plurality of sensor electrodes of the plurality of sensor electrodes 120 and is spaced apart from other transmitter groups of the first plurality of transmitter groups or of the second plurality of transmitter groups (i.e., separated by one or more sensor electrodes that are not included in the particular transmitter group 315). The process may further comprise driving one or more additional pluralities of the transmitter groups 315 during additional periods (e.g., a third plurality of transmitter groups 315, a fourth plurality of transmitter groups 315) according to the predefined sequence.

In some embodiments, some or all of the plurality of transmitter groups 315 comprise a plurality of contiguous sensor electrodes 120. In one non-limiting example, the plurality of contiguous sensor electrodes of each transmitter group 315 of the first plurality of transmitter groups and of each transmitter group 315 of the second plurality of transmitter groups comprises (1) two sensor electrodes that are contiguous along a first axis of the sensor array, and (2) two sensor electrodes that are contiguous along a second axis of the sensor array. The first axis and the second axis may have any relative orientation, e.g., orthogonal to each other.

In one non-limiting example, within the first plurality of transmitter groups and within the second plurality of transmitter groups, different transmitter groups 315 of the first plurality and/or the second plurality are separated by (at least) two sensor electrodes along the first axis and by (at least) two sensor electrodes along the second axis. The different transmitter groups 315 may be alternately separated by different numbers of sensor electrodes, such as one sensor electrode or three sensor electrodes or more along one or more axes of the sensor array.

In some embodiments, the sensor module 210 performs the scan of the sensor array by performing a process comprising (1) acquiring the absolute capacitive measurements 320 during a first period, and (2) acquiring the transcapacitive measurements 325 during a second period. In one non-limiting example, the sensor module 210 contemporaneously drives all of the plurality of sensor electrodes 120 with a same modulated signal during the first period. The sensor module 210 acquires the absolute capacitive measurements 320 corresponding to each of the plurality of sensor electrodes 120, which may be non-overlapping, partly overlapping, or fully overlapping in time during the first period.

In some embodiments, the sensor module 210 drives a first plurality of the transmitter groups 315 with a modulated signal during a first sub-period of the second period, and drives a second plurality of the transmitter groups 315 with a modulated signal during a second sub-period of the second period. In some embodiments, according to the predefined sequence, a single transcapacitive measurement is acquired for each combination of a particular sensor electrode and a bordering sensor electrode of one or more bordering sensor electrodes.

In some embodiments, during the predefined sequence multiple transcapacitive measurements are acquired for at least one combination of a particular sensor electrode and a bordering sensor electrode, and the sensor module 210 (or the processing system 110) performs processing to acquire the transcapacitive measurement. For example, according to the predefined sequence, the sensor module 210 drives first sensor electrodes of the plurality of sensor electrodes 120 with a modulated signal during a first sub-period of the second period (during which the transcapacitive measurements are acquired), drives second sensor electrodes of the plurality of sensor electrodes with a modulated signal during a second sub-period of the second period, and performs one or more matrix operations to acquire the transcapacitive measurement between the sensor electrode and the bordering sensor electrode.

In some cases, the first sensor electrodes are contiguous along a first axis of the sensor array, and the second sensor electrodes are contiguous along a second axis of the sensor array. According to the predefined sequence, the sensor module 210 may further drive third sensor electrodes of the plurality of sensor electrodes with a modulated signal during a third sub-period of the second period. In some cases, the third sensor electrodes comprise alternating sensor electrodes of the sensor array, and the one or more matrix operations comprise at least one of matrix addition or matrix subtraction.

Beneficially, by operating the sensor module 210 to acquire both the absolute capacitive measurements 320 and the transcapacitive measurements 325 for the plurality of sensor electrodes 120, the effective active area for the sensor array is increased for a given number of sensor electrodes and routing traces. The sensor array may be alternately described as having an improved sensing resolution for the given number of sensor electrodes and routing traces. For example, for a sensor array comprising a rectangular grid of sensor electrodes (e.g., in n rows and m columns), the number of sensing nodes is increased from (n×m) to ((2n−1)×(2m−1)).

Further, an increased sensing performance provided via the improved sensing resolution may be achieved without requiring a more complex arrangement of the plurality of sensor electrodes 120 and the routing traces. For example, the placement of the plurality of sensor electrodes 120 and the routing traces may be determined using standard techniques. The lower complexity sensor array may reduce costs and/or increase yield associated with manufacturing the input device.

While the techniques described herein are generally applicable to sensor arrays of any arrangement and size, the benefits described above may be especially pronounced for devices with smaller sensor arrays having sensor electrodes and routing traces in a single layer. In one non-limiting example, a smaller sensor array has a diameter that is less than about 2", although other sizes are also possible. Some non-limiting examples of devices using smaller sensor arrays include body-wearable devices (e.g., watches) and smaller networked devices (such as "Internet of Things" (IoT) devices). Using techniques described herein, the smaller sensor array may have an increased sensing performance despite a small number of the plurality of sensor electrodes 120, without requiring complex arrangements of the sensor electrodes and routing traces.

Figure 4:
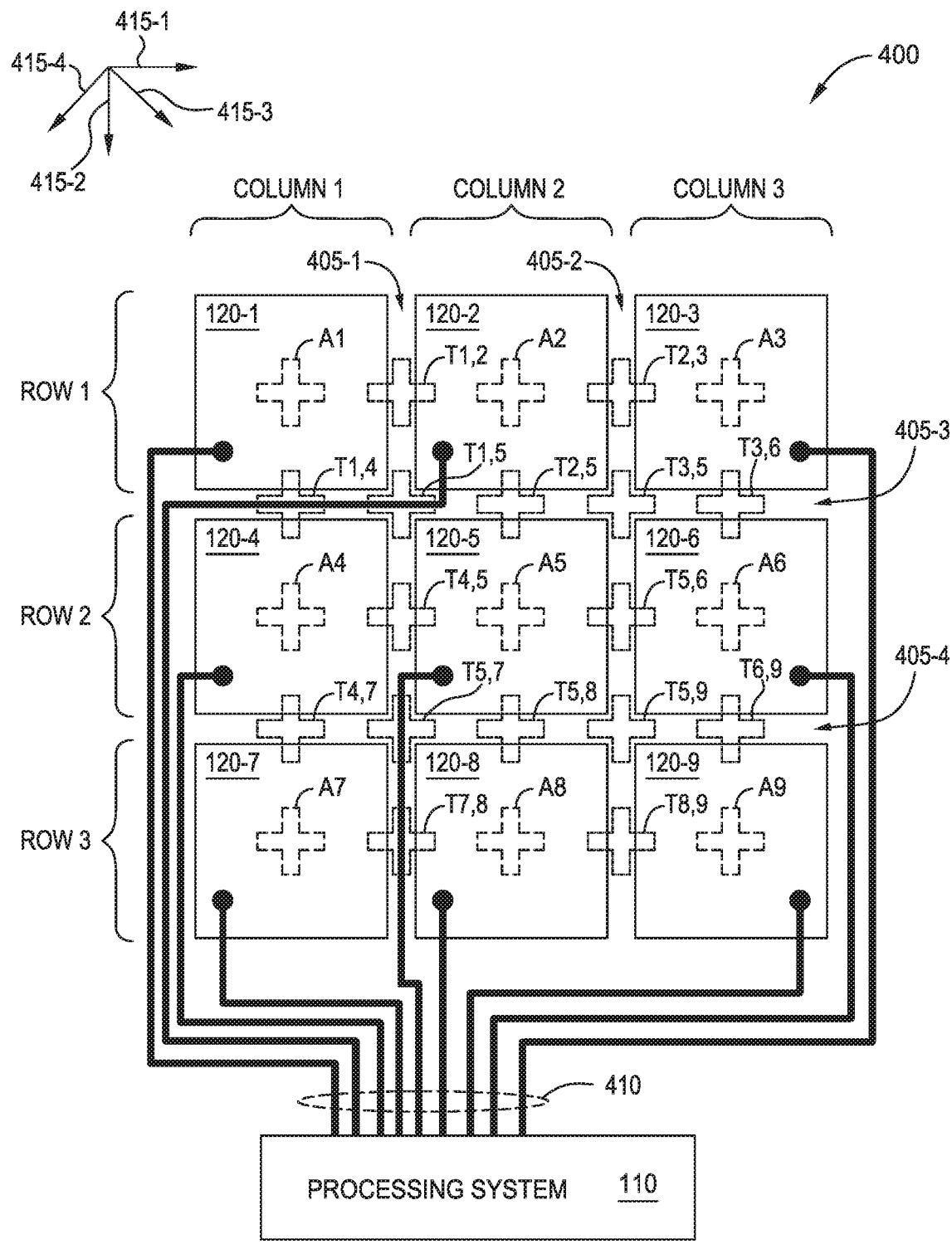
FIG. 4 is a diagram illustrating an exemplary arrangement of sensor electrodes and routing traces in a single layer, according to embodiments described herein.

FIG. 4 is a diagram 400 illustrating an exemplary arrangement of sensor electrodes and routing traces in a single layer, according to embodiments described herein. The features illustrated in the diagram 400 may be used in conjunction with other embodiments described herein.

The arrangement shown in the diagram 400 comprises nine sensor electrodes 120-1, 120-2, . . . , 120-9 in a 3×3 arrangement. That is, the sensor electrodes 120-1, 120-2, . . . , 120-9 are arranged in a rectangular grid comprising three rows and three columns ("3×3"). Each of the rows (Row 1, Row 2, Row 3) extends along an axis 415-1, such that the rows are parallel to each other. Each of the columns (Column 1, Column 2, Column 3) extends along an axis 415-2 that is substantially orthogonal to the axis 415-1, such that the columns are parallel to each other. The sensor electrodes 120-1, 120-2, . . . , 120-9 are also arranged according to axes 415-3, 415-4 that are non-orthogonal to the axes 415-1, 415-2. The axes 415-3, 415-4 are substantially orthogonal to each other.

Row 1 includes the sensor electrodes 120-1, 120-2, 120-3, Row 2 includes the sensor electrodes 120-4, 120-5, 120-6, and Row 3 includes the sensor electrodes 120-7, 120-8, 120-9. Column 1 includes the sensor electrodes 120-1, 120-4, 120-7, Column 2 includes the sensor electrodes 120-2, 120-5, 120-8, and Column 3 includes the sensor electrodes 120-3, 120-6, 120-9.

An interstice 405-1 separates (and electrically insulates) the sensor electrodes of Column 1 from the sensor electrodes of Column 2. An interstice 405-2 separates (and electrically insulates) the sensor electrodes of Column 2 from the sensor electrodes of Column 3. An interstice 405-3 separates (and electrically insulates) the sensor electrodes of Row 1 from the sensor electrodes of Row 2. An interstice 405-4 separates the sensor electrodes of Row 2 from the sensor electrodes of Row 3. The interstices 405-1, 405-2, 405-3, 405-4 may have any suitable form, such as air gaps or deposits of insulative material.

A plurality of routing traces 410 communicatively couples the plurality of sensor electrodes 120-1, . . . , 120-9 with the processing system 110. In some embodiments, the plurality of routing traces 410 is included in a single layer with the plurality of sensor electrodes 120-1, . . . , 120-9. In such a case, the plurality of routing traces 410 do not overlap (that is, intersect) in the single layer. To reduce the overall size of the sensor array while accomplishing the non-overlapping arrangement, one or more of the routing traces 410 may partly or fully extend along one or more of the interstices 405-1, 405-2, 405-3, 405-4. As shown, a routing trace 410 that couples the processing system 110 to the sensor electrode 120-2 extends along the interstice 405-3 (intersecting the interstice 405-1), and a routing trace 410 that couples the processing system 110 to the sensor electrode 120-5 extends along the interstice 405-1 (intersecting the interstice 405-4).

The sensor electrodes 120-1, 120-2, . . . , 120-9 and the plurality of routing traces 410 may be formed of any suitable material(s). In some embodiments, the sensor electrodes 120-1, 120-2, . . . , 120-9 and the plurality of routing traces 410 are substantially optically transmissive, such that a display layer of the device is viewable through the layer comprising the sensor electrodes 120-1, 120-2, . . . , 120-9 and the plurality of routing traces 410.

In some embodiments, the sensor electrodes 120-1, 120-2, . . . , 120-9 and the plurality of routing traces 410 comprise a metal mesh material having properties such that the sensor electrodes 120-1, 120-2, . . . , 120-9 and the plurality of routing traces 410 are substantially optically transmissive. For example, the metal mesh material may be copper or other suitably conductive metal that is not itself optically transmissive. Each of the sensor electrodes 120-1, 120-2, . . . , 120-9 and/or the plurality of routing traces 410 may comprise relatively thin lines of the metal mesh material (e.g., between about 1 and about 10 microns wide). In some embodiments, the thin lines of the metal mesh material are spaced apart to form a plurality of interstitial spaces, which provide the substantially optically transmissive property to the metal mesh when viewed on a macroscopic scale.

In other embodiments, the sensor electrodes 120-1, 120-2, . . . , 120-9 and the plurality of routing traces 410 comprise an optically transmissive film material such as indium tin oxide (ITO). The optically transmissive film material may be optically transmissive both at macroscopic and microscopic scales.

The sensor electrodes 120-1, 120-2, . . . , 120-9 form a plurality of capacitive nodes. Each of the sensor electrodes 120-1, 120-2, . . . , 120-9 corresponds to an absolute capacitive node A1, A2, . . . , A9. Combinations of different ones of the sensor electrodes 120-1, 120-2, . . . , 120-9 also correspond to a plurality of transcapacitive nodes T1,2 (between sensor electrodes 120-1, 120-2), T2,3 (between sensor electrodes 120-2, 120-3), . . . , T8,9 (between sensor electrodes 120-8, 120-9).

As shown, each sensor electrode 120-1, 120-2, . . . , 120-9 forms transcapacitive node(s) with one or more bordering sensor electrodes. For example, the sensor electrode 120-1 forms transcapacitive nodes T1,2, T1,4, T1,5 with the (bordering) sensor electrodes 120-2, 120-4, 120-5. While the effects of driving the sensor electrode 120-1 may be reflected in measurements acquired by other, non-bordering sensor electrodes such as sensor electrode 120-9, these effects are considered to be negligible compared to the effects of driving the sensor electrode 120-1 on the bordering sensor electrodes.

Further, based on the arrangement of the sensor electrodes 120-1, 120-2, . . . , 120-9, different transcapacitive nodes may overlap. For example, the transcapacitive node T1,5 (between sensor electrodes 120-1, 120-5) may also correspond to a transcapacitive node T2,4 (between sensor electrodes 120-2, 120-4), the transcapacitive node T3-5 may correspond to a transcapacitive node T2,6, the transcapacitive node T5,7 may correspond to a transcapacitive node T4,8, the transcapacitive node T5,9 may correspond to a transcapacitive node T6,8, and so forth.

In some embodiments, the processing system 110 scans the sensor array by driving different ones of the sensor electrodes 120-1, 120-2, . . . , 120-9 according to a predefined sequence. In some embodiments, during different periods, the processing system 110 drives different groups of selected one(s) of the sensor electrodes 120-1, 120-2, . . . , 120-9, which in some cases may correspond to the transmitter groups 315 described with respect to FIG. 3. In one example, the groups are determined according to the axes 415-1, 415-2, 415-3, and/or 415-4. In some embodiments, according to the predefined sequence, a single transcapacitive measurement is acquired for each combination of a particular sensor electrode 120-1, 120-2, . . . , 120-9 and a bordering sensor electrode. In other embodiments, multiple transcapacitive measurements are acquired for one or more of the combinations.

The processing system 110 operates the plurality of sensor electrodes 120-1, 120-2, . . . , 120-9 to scan the sensor array. By scanning the absolute capacitive nodes A1, A2, . . . , A9 as well as the transcapacitive nodes T1,2, T2,3, ..., T8,9, an improved sensing resolution may be achieved for a given number of the sensor electrodes 120-1, 120-2, ..., 120-9 and the routing traces 410.

Figure 5:
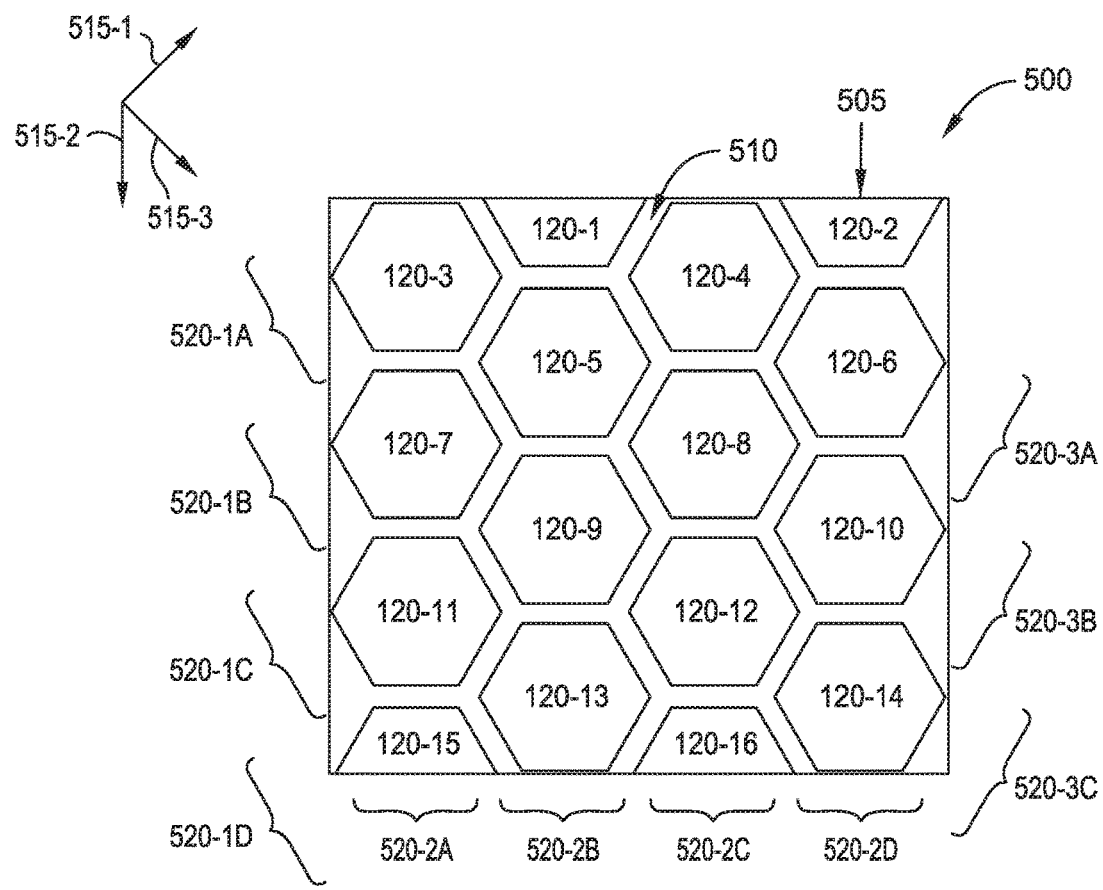
FIG. 5 is a diagram illustrating an exemplary arrangement of hexagonal sensor electrodes, according to embodiments described herein.

Although the diagram 400 illustrates rectangular-shaped sensor electrodes 120-1, 120-2, ..., 120-9 in a rectangular array, other shapes and/or arrangements of the sensor electrodes 120-1, 120-2, ..., 120-9 are also possible. For example, FIG. 5 is a diagram 500 illustrating an exemplary arrangement of hexagonal sensor electrodes, according to embodiments described herein.

A portion 505 of the sensor array that is illustrated in the diagram 500 comprises a plurality of sensor electrodes 120-1, 120-2, ..., 120-16. The sensor electrodes 120-1, 120-2, ..., 120-16 are shown as being regular hexagons (that is, equilateral and equiangular hexagons) but other types of hexagons are also possible. The sensor electrodes 120-1, 120-2, ..., 120-16 are separated by interstices 510. Although not illustrated, one or more routing traces may extend along the interstices 510 to couple with one or more of the sensor electrodes 120-1, 120-2, ..., 120-16.

The plurality of sensor electrodes 120-1, 120-2, ..., 120-16 are arranged in groups extending along three non-orthogonal axes 515-1, 515-2, 515-3. Groups 520-1A, 520-1B, 520-1C, 520-1D each extend along the axis 515-1, groups 520-2A, 520-2B, 520-2C, 520-2D each extend along the axis 515-2, and groups 520-3A, 520-3B, 520-3C each extend along the axis 515-3. The group 520-1A includes the sensor electrodes 120-1, 120-3. The group 520-1B includes the sensor electrodes 120-2, 120-4, 120-5, 120-7. The group 520-1C includes the sensor electrodes 120-6, 120-8, 120-9, 120-11. The group 520-1D includes the sensor electrodes 120-10, 120-12, 120-13, 120-15. The groups 520-1A, 520-1B, 520-1C, 520-1D are substantially parallel to each other.

The group 520-2A includes the sensor electrodes 120-3, 120-7, 120-11, 120-15. The group 520-2B includes the sensor electrodes 120-1, 120-5, 120-9, 120-13. The group 520-2C includes the sensor electrodes 120-4, 120-8, 120-12, 120-16. The group 520-2D includes the sensor electrodes 120-2, 120-6, 120-10, 120-14. The groups 520-2A, 520-2B, 520-2C, 520-2D are substantially parallel to each other.

The group 520-3A includes the sensor electrodes 120-1, 120-4, 120-6. The group 520-3B includes the sensor electrodes 120-3, 120-5, 120-8, 120-10. The group 520-3C includes the sensor electrodes 120-7, 120-9, 120-12, 120-14. The groups 520-3A, 520-3B, 520-3C are substantially parallel to each other. Although not discussed here, the plurality of sensor electrodes 120-1, 120-2, ..., 120-16 may also be arranged in groups that extend along other axes.

Beneficially, the arrangement of the plurality of sensor electrodes 120-1, 120-2, ..., 120-16 along multiple axes 515-1, 515-2, 515-3 allows for greater flexibility when performing a scan of the sensor array. In some cases, the scan may be performed in such a way as to reduce an amount of time needed to acquire the capacitive measurements for the scan, to minimize a number of redundant capacitive measurements (e.g., multiple transcapacitive measurements acquired for a single transcapacitive node during the scan), and so forth. In this way, the scan of the sensor array may require less processing, allowing quicker completion of sensing, reduced power consumption, etc.

Beneficially, the hexagonal sensor electrodes of the portion 505 may provide improved and/or more uniform sensing performance when acquiring transcapacitive measurements, as each sensor electrode (e.g., the sensor electrode 120-8) has substantially a same border interface (e.g., a length or an area) with each of the bordering sensor electrodes 120-4, 120-5, 120-6, 120-9, 120-10, 120-12. In comparison, the rectangular sensor electrodes of FIG. 4 may exhibit a less uniform response when acquiring certain transcapacitive measurements. For example, consider the sensor electrode 120-1 of the diagram 400. The transcapacitive nodes T1,2, T1,4 may have a relatively uniform response, as each corresponds to substantially a same (linear) border interface. However, the transcapacitive node T1,5 may have a different response than that of the transcapacitive nodes T1,2, T1,4, as each of the sensor electrodes 120-1, 120-5 tapers to a point and provides a different border interface. In some cases, the more uniform sensing performance requires less processing, allowing quicker completion of sensing, reduced power consumption, etc.

Figure 6:
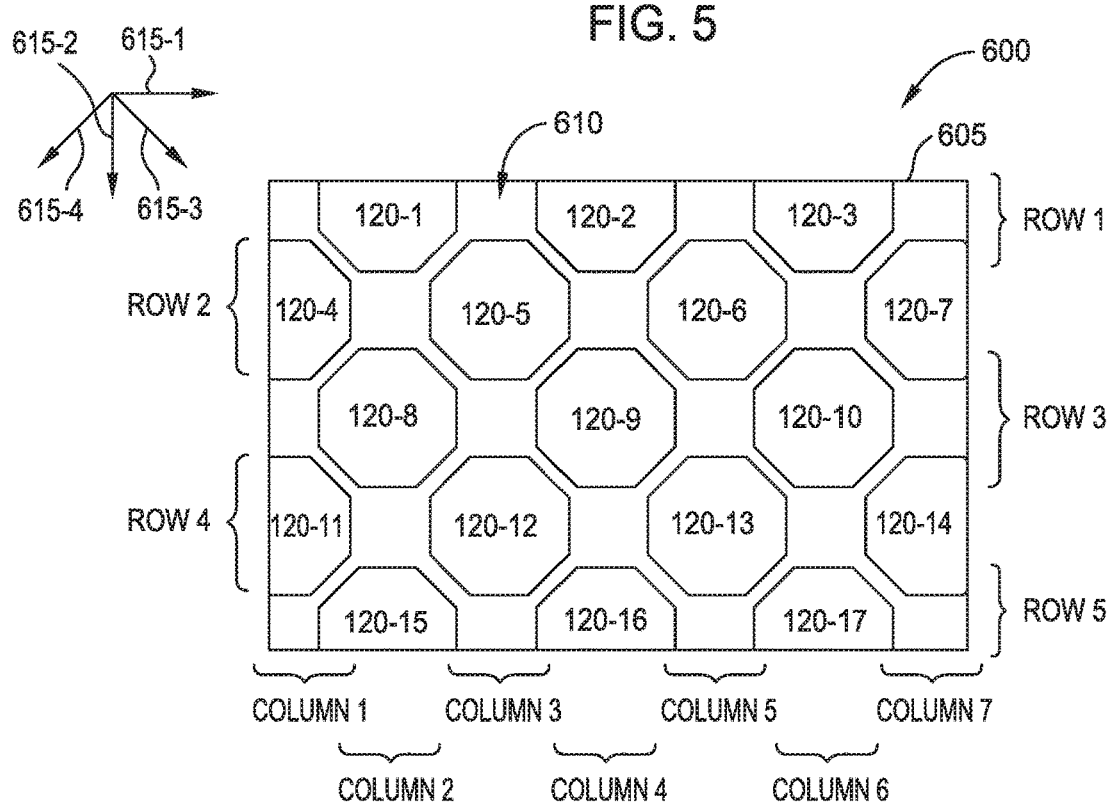
FIG. 6 is a diagram illustrating an exemplary arrangement of octagonal sensor electrodes, according to embodiments described herein.

Next, FIG. 6 is a diagram 600 illustrating an exemplary arrangement of octagonal sensor electrodes, according to embodiments described herein. A portion 605 of the sensor array that is illustrated in the diagram 600 comprises a plurality of sensor electrodes 120-1, 120-2, ..., 120-17. The sensor electrodes 120-1, 120-2, ..., 120-17 are shown as regular octagons (that is equilateral and equiangular octagons) but other types of octagons are also possible.

The sensor electrodes 120-1, 120-2, ..., 120-17 are separated by interstices 610. Although not illustrated, one or more routing traces may extend along the interstices 610 to couple with one or more of the sensor electrodes 120-1, 120-2, ..., 120-17. Each of the rows (Row 1, Row 2, Row 3, Row 4, Row 5) extends along an axis 615-1, such that the rows are parallel to each other. Each of the columns (Column 1, Column 2, Column 3, Column 4, Column 5, Column 6, Column 7) extends along an axis 615-2 that is substantially orthogonal to the axis 615-1, such that the columns are parallel to each other.

Row 1 includes the sensor electrodes 120-1, 120-2, 120-3. Row 2 includes the sensor electrodes 120-4, 120-5, 120-6, 120-7. Row 3 includes the sensor electrodes 120-8, 120-9, 120-10. Row 4 includes the sensor electrodes 120-11, 120-12, 120-13, 120-14. Row 5 includes the sensor electrodes 120-15, 120-16, 120-17.

Column 1 includes the sensor electrodes 120-4, 120-11. Column 2 includes the sensor electrodes 120-1, 120-8, 120-15. Column 3 includes the sensor electrodes 120-5, 120-12. Column 4 includes the sensor electrodes 120-2, 120-9, 120-16. Column 5 includes the sensor electrodes 120-6, 120-13. Column 6 includes the sensor electrodes 120-3, 120-10, 120-17. Column 7 includes the sensor electrodes 120-7, 120-14.

In addition to the rows and columns, the plurality of sensor electrodes 120-1, 120-5, ..., 120-17 are also arranged in groups that extend along axes 615-3, 615-4 that are non-orthogonal to the axes 615-1, 615-2. The axes 615-3, 615-4 are orthogonal to each other. As shown, a first group along the axis 615-3 may include the sensor electrodes 120-3, 120-7, a second group along the axis 615-3 may include the sensor electrodes 120-2, 120-6, 120-10, 120-14, a third group along the axis 615-3 may include the sensor electrodes 120-1, 120-5, 120-9, 120-13, 120-17, a fourth group along the axis 615-3 may include the sensor electrodes 120-4, 120-8, 120-12, 120-16, and a fifth group along the axis 615-3 may include the sensor electrodes 120-11, 120-15. A first group along the axis 615-4 may include the sensor electrodes 120-1, 120-4, a second group along the axis 615-4 may include the sensor electrodes 120-2, 120-5, 120-8, 120-11, a third group along the axis 615-4 may include the sensor electrodes 120-3, 120-6, 120-9, 120-12, 120-15, a fourth group along the axis 615-4 may include the sensor electrodes 120-7, 120-10, 120-13, 120-16, and a fifth group along the axis 615-4 may include the sensor electrodes 120-14, 120-17. Although not discussed here, the plurality of sensor electrodes 120-1, 120-2, . . . , 120-17 may also be arranged in groups that extend along other axes.

The arrangement of octagonal sensor electrodes in the diagram 600 may provide benefits similar to those discussed above with respect to FIG. 5, such as providing greater flexibility when performing a scan of the sensor array, and/or providing improved and/or more uniform sensing performance.

Thus, in the diagram 600, the sensor electrodes 120-1, 120-2, . . . , 120-17 are arranged according to two sets of dual-axis coordinate systems (e.g., a first set comprising the axes 615-1, 615-2, and a second set comprising the axes 615-3, 615-4) that are superimposed. The diagram 400 of FIG. 4 has a similar arrangement.

Sensing according to the different axes 615-1, 615-2, 615-3, 615-4 may provide different sensing performance. For example, compared to sensor electrodes of the second set (i.e., axes 615-3, 615-4), the sensor electrodes of the first set (i.e., axes 615-1, 615-2) are spaced further apart from each other. With the greater spacing, driving the sensor electrodes according to the second set may be used to sense objects at a greater distance from the sensing surface.

When combined with performing absolute capacitive sensing, the arrangement of the sensor electrodes 120-1, 120-2, . . . , 120-17 of the diagram 600 supports sensing according to at least three coordinate systems, each providing sensing nodes at spatially distinct positions across the sensing surface, and which may provide different sensitivity to sensing height.

Figure 7:
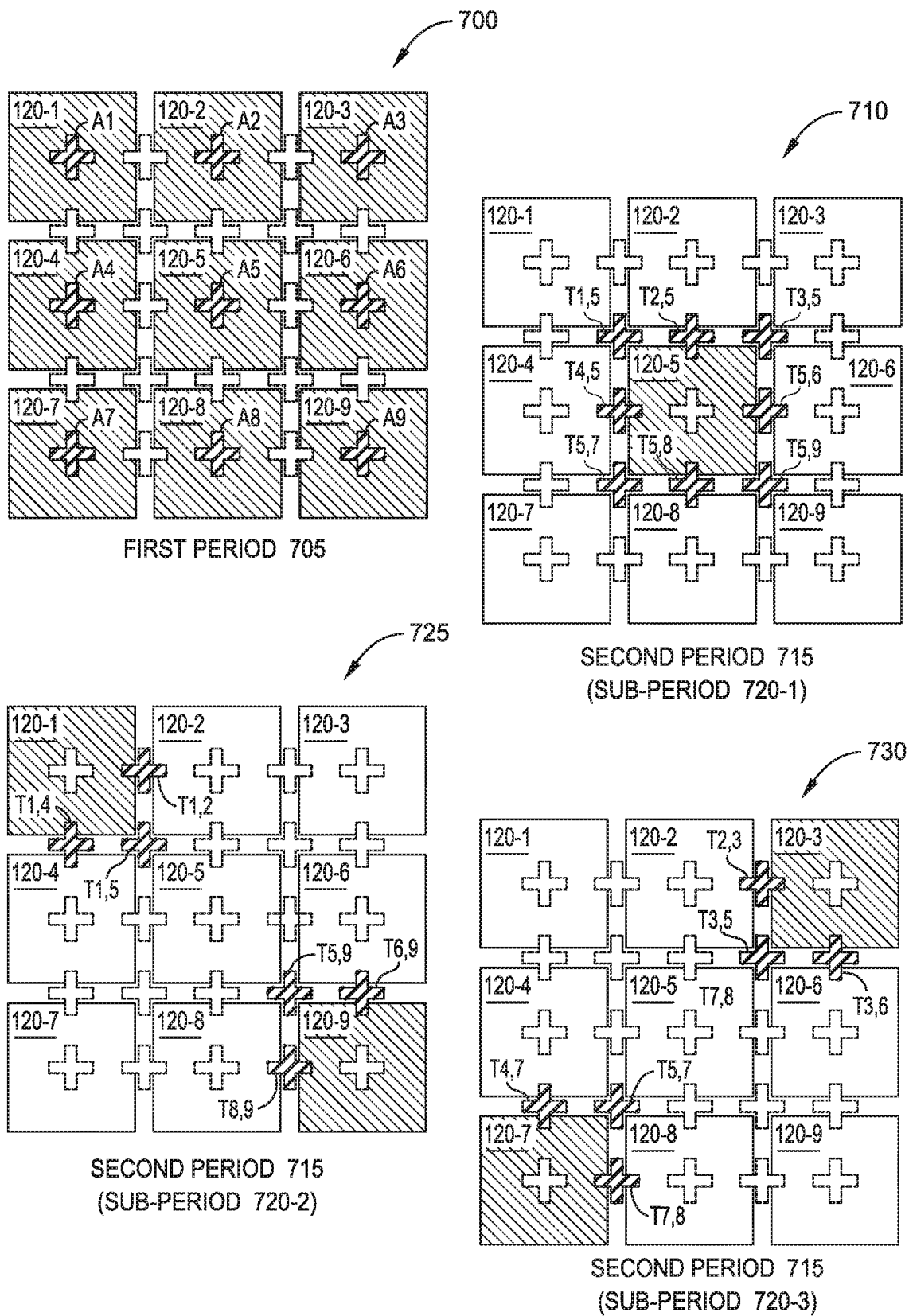
FIGS. 7-9 illustrate exemplary sequences of performing a scan of a sensor array, according to embodiments described herein.

FIG. 7 illustrates an exemplary sequence of performing a scan of a sensor array, according to embodiments described herein. The features illustrated in the diagrams 700, 710, 725, 730 may be used in conjunction with other embodiments described herein. For example, the exemplary sequence is described using the 3×3 rectangular grid of the diagram 400 of FIG. 4.

The diagram 700 illustrates operation of the sensor array during a first period 705. During the first period 705, absolute capacitive measurements are acquired for each of the plurality of sensor electrodes 120-1, 120-2, . . . , 120-9. In some embodiments, all of the sensor electrodes 120-1, 120-2, . . . , 120-9 are driven with a modulated signal (shown as light hatching), and absolute capacitive measurements corresponding to the absolute capacitive nodes A1, . . . , A9 (shown with heavy hatching) are acquired. In some embodiments, the sensor electrodes 120-1, 120-2, . . . , 120-9 are driven contemporaneously (e.g., partly or fully overlapping in time). The absolute capacitive measurements may be acquired separately or contemporaneously.

The diagram 710 illustrates operation of the sensor array during a first sub-period 720-1 of a second period 715. During the second period 715, one or more transcapacitive measurements are acquired for each of the transcapacitive sensing nodes T1,2, T2,3, . . . , T8,9. During the first sub-period 720-1, the sensor electrode 120-5 is driven with a modulated signal, and transcapacitive measurements are acquired corresponding to the transcapacitive nodes T1,5, T2,5, T3,5, T4,5, T5,6, T5,7, T5,8, T5,9. The transcapacitive measurements reflect effects of driving the sensor electrode 120-5 on the (bordering) sensor electrodes 120-1, 120-2, 120-3, 120-4, 120-6, 120-7, 120-8, 120-9. The transcapacitive measurements may be acquired separately or contemporaneously.

The diagram 725 illustrates operation of the sensor array during a second sub-period 720-2 of the second period 715. During the second sub-period 720-2, the sensor electrodes 120-1, 120-9 are driven with a modulated signal, and transcapacitive measurements are acquired corresponding to the transcapacitive nodes T1,2, T1,4, T1,5, T5,9, T6,9, T8,9. The transcapacitive measurements reflect effects of driving the sensor electrodes 120-1, 120-9 on the sensor electrodes 120-2, 120-4, 120-5, 120-6, 120-8.

As shown, the sensor electrodes 120-2, 120-4, 120-5 border the sensor electrode 120-1, and the sensor electrodes 120-5, 120-6, 120-8 border the sensor electrode 120-9. In some cases, the acquired transcapacitive measurements reflect transcapacitive measurements for each of the bordering electrodes that border the sensor electrodes 120-1, 120-9 driven during the second sub-period 720-2. The transcapacitive measurements may be acquired separately or contemporaneously.

The diagram 730 illustrates operation of the sensor array during a third sub-period 720-3 of the second period 715. During the third sub-period 720-3, the sensor electrodes 120-3, 120-7 are driven with a modulated signal, and transcapacitive measurements are acquired corresponding to the transcapacitive nodes T2,3, T3,5, T3,6, T4,7, T5,7, T7,8. The transcapacitive measurements reflect effects of driving the sensor electrodes 120-3, 120-7 on the sensor electrodes 120-2, 120-4, 120-5, 120-6, 120-8.

As shown, the sensor electrodes 120-2, 120-5, 120-6 border the sensor electrode 120-3, and the sensor electrodes 120-4, 120-5, 120-8 border the sensor electrode 120-7. In some cases, the acquired transcapacitive measurements reflect transcapacitive measurements for each of the bordering electrodes that border the sensor electrodes 120-3, 120-7 driven during the third sub-period 720-3. The transcapacitive measurements may be acquired separately or contemporaneously.

According to the sequence illustrated in the diagrams 700, 710, 725, 730, capacitive measurements are acquired for each of the absolute capacitive nodes A1, . . . , A9 and each of the transcapacitive node T1-2, . . . , T8-9 during the scan of the sensor array. During the second period 715, the sequence of driving sensor electrodes may be selected such that each of the transcapacitive nodes T1,2, T2,3, . . . , T8,9 is sensed at least once. In some cases, certain transcapacitive nodes are sensed more than once.

Processing may be performed on the multiple transcapacitive measurements for a particular transcapacitive node to isolate (or normalize) the different transcapacitive measurements. In one example, one or more of the multiple transcapacitive measurements for a particular transcapacitive node may be discarded. In another example, the multiple transcapacitive measurements may be averaged. Other combinations of multiple transcapacitive measurements for a transcapacitive node are also possible.

Further, other sequences of acquiring absolute capacitive measurements and transcapacitive measurements are also possible. For example, the entirety of the second period 715 may occur before the first period 705, the first period 705 may occur between two sub-periods 720-1, 720-2, 720-3 of the second period 715, and so forth.

The sensor electrodes driven during the different sub-periods 720-1, 720-2, 720-3 may be selected to improve the distinguishability of the effects on particular bordering sensor electrodes. Stated another way, if the sensor electrodes driven during a particular sub-period 720-1, 720-2, 720-3 are too close together, the response on the bordering sensor electrodes may result in the superposition of effects from the different sensor electrodes, which would be indistinguishable. For the relatively small number of sensor electrodes 120-1, 120-2, . . . , 120-9 in the 3×3 rectangular grid, the sensor electrodes that are driven during a particular sub-period 720-1, 720-2, 720-3 are separated by one sensor electrode.

However, for larger sensor arrays having greater numbers of sensor electrodes, the sensor electrodes that are driven during a particular sub-period may be separated by more than one sensor electrode that is not driven during the sub-period, to improve distinguishability of the effects of driving the sensor electrodes. In some cases, the sensor electrodes are driven as pluralities of contiguous sensor electrodes of different transmitter groups that are separated from each other by the more than one sensor electrodes. In one embodiment, the plurality of contiguous sensor electrodes of each transmitter group of a first plurality of transmitter groups and of each transmitter group of a second plurality of transmitter groups comprises two sensor electrodes that are contiguous along a first axis of the sensor array, and two sensor electrodes that are contiguous along a second axis of the sensor array. Within the first plurality of transmitter groups and within the second plurality of transmitter groups, different transmitter groups are separated by two sensor electrodes along the first axis and by two sensor electrodes along the second axis.

Figure 8:
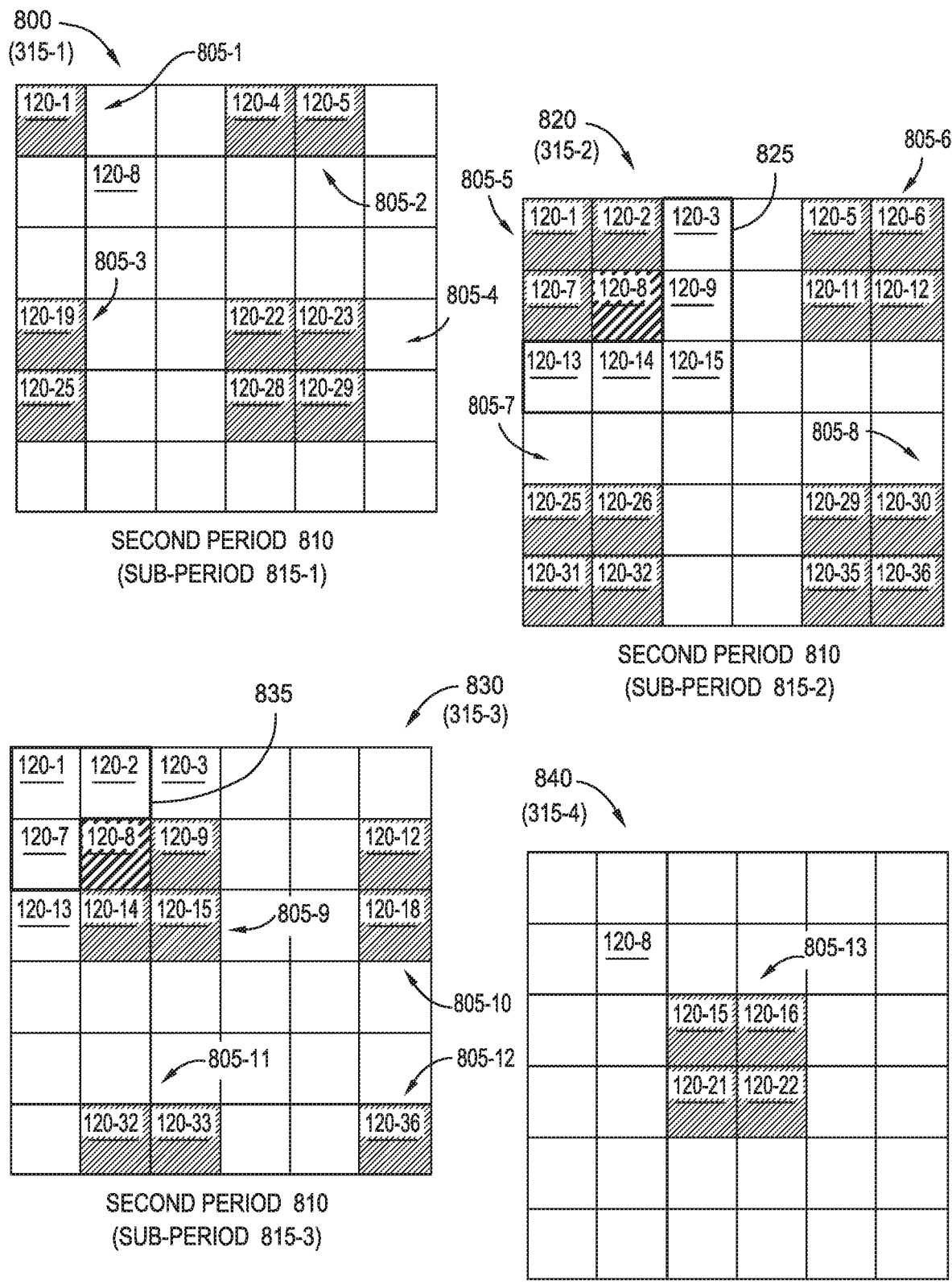

FIG. 8 illustrates an exemplary sequence of performing a scan of a sensor array, according to embodiments described herein. More specifically, diagrams 800, 820, 830, 840 illustrate four sub-periods 815-1, 815-2, 815-3, 815-4 during which different transcapacitive measurements are acquired for the sensor array. The features illustrated in the sequence of FIG. 8 may be used in conjunction with other embodiments described herein, such as in conjunction with performing absolute capacitive sensing using the sensor array. As shown, the sensor array comprises thirty-six (36) sensor electrodes arranged in a rectangular 6×6 arrangement, although other numbers and arrangements of sensor electrodes are also possible. For ease of understanding, the operation of a particular sensor electrode 120-8 of the sensor array during the sub-periods 815-1, 815-2, 815-3, 815-4 will be described.

The diagram 800 illustrates a first sub-period 815-1 of a second period 810, during which transcapacitive measurements are acquired. During the first sub-period 815-1, a first plurality 315-1 of transmitter groups 805-1, 805-2, 805-3, 805-4 is driven with a modulated signal. In some embodiments, the different transmitter groups 805-1, 805-2, 805-3, 805-4 are driven with a same modulated signal. In other embodiments, some or all of the different transmitter groups 805-1, 805-2, 805-3, 805-4 are driven with different modulated signals.

The transmitter group 805-1 comprises sensor electrode 120-1, the transmitter group 805-2 comprises sensor electrodes 120-4, 120-5 that are contiguous along a first axis of the sensor array, the transmitter group 805-3 comprises sensor electrodes 120-19, 120-25 that are contiguous along a second axis of the sensor array, and the transmitter group 805-4 comprises sensor electrodes 120-22, 120-23, 120-28, 120-29. The sensor electrodes 120-22, 120-23, 120-28, 120-29 of the transmitter group 805-4 are contiguous along the first axis and along the second axis.

During the first sub-period 815-1, the sensor electrode 120-8 is not driven with a modulated signal. The sensor electrode 120-8 borders the sensor electrode 120-1 that is driven as part of the transmitter group 805-1, and a transcapacitive measurement may be acquired during the first sub-period 815-1. While it is possible that effects from driving other sensor electrodes (of other transmitter groups 805-2, 805-3, 805-4) may be reflected in the transcapacitive measurement acquired using the sensor electrode 120-8, it will be assumed for purposes of this example that the transcapacitive measurement primarily reflects the effects from driving the sensor electrode 120-2 that borders the sensor electrode 120-8.

The diagram 820 illustrates a second sub-period 815-2 of the second period 810, during which transcapacitive measurements are acquired. During the second sub-period 815-2, a second plurality 315-2 of transmitter groups 805-5, 805-6, 805-7, 805-8 is driven with a modulated signal. As mentioned previously, the different transmitter groups 805-5, 805-6, 805-7, 805-8 may be driven with a same modulated signal or with different modulated signals.

The transmitter group 805-5 comprises sensor electrodes 120-1, 120-2, 120-7, 120-8, the transmitter group 805-6 comprises sensor electrodes 120-5, 120-6, 120-11, 120-12, the transmitter group 805-7 comprises sensor electrodes 120-25, 120-26, 120-31, 120-32, and the transmitter group 805-8 comprises sensor electrode 120-29, 120-30, 120-35, 120-36. Sensor electrodes of each of the transmitter groups 805-5, 805-6, 805-7, 805-8 are contiguous along the first axis and along the second axis of the sensor array.

In some embodiments, the predefined sequence specifies the different transmitter groups of the sub-periods 815-1, 815-2, 815-3, 815-4 such that the different transmitter groups appear to progress sequentially across the sensor array. For example, each of the transmitter groups 805-5, 805-6, 805-7, 805-8 of the second sub-period 815-2 are shifted down one sensor electrode and shifted right one sensor electrode from the transmitter groups 805-1, 805-2, 805-3, 805-4 of the first sub-period 815-1.

During the second sub-period 815-2, the sensor electrode 120-8 is driven with a modulated signal (shown with hatching) as part of the transmitter group 805-5. A group 825 comprising the sensor electrodes 120-3, 120-9, 120-13, 120-14, 120-15 borders the sensor electrode 120-8 and may experience effects from driving the sensor electrode 120-8. Transcapacitive measurements may be acquired using one or more of the sensor electrodes 120-3, 120-9, 120-13, 120-14, 120-15 during the second sub-period 815-2.

As shown in the diagram 820, the different transmitter groups 805-5, 805-6, 805-7, 805-8 are separated by two sensor electrodes along the first axis of the sensor array, and by two sensor electrodes along the second axis of the sensor array. In this way, the transcapacitive measurements acquired using the sensor electrodes 120-3, 120-9, 120-13, 120-14, 120-15 will primarily reflect the effects from driving the sensor electrodes 120-1, 120-2, 120-7, 120-8 of the transmitter group 805-5 that border the sensor electrodes 120-3, 120-9, 120-13, 120-14, 120-15.

The diagram 830 illustrates a third sub-period 815-3 of the second period 810, during which transcapacitive measurements are acquired. During the third sub-period 815-3, a third plurality 315-3 of transmitter groups 805-9, 805-10, 805-11, 805-12 is driven with a modulated signal. As mentioned previously, the different transmitter groups 805-9, 805-10, 805-11, 805-12 may be driven with a same modulated signal or with different modulated signals.

The transmitter group 805-9 comprises sensor electrodes 120-8, 120-9, 120-14, 120-15. The transmitter group 805-10 comprises sensor electrodes 120-12, 120-18. The transmitter group 805-11 comprises sensor electrodes 120-32, 120-33. The transmitter group 805-12 comprises sensor electrode 120-36. The sensor electrodes 120-32, 120-33 of the transmitter group 805-11 are contiguous along the first axis of the sensor array, the sensor electrodes 120-12, 120-18 of the transmitter group 805-10 are contiguous along the second axis of the sensor array, and the sensor electrodes 120-8, 120-9, 120-14, 120-15 of the transmitter group 805-9 are contiguous along the first axis and along the second axis of the sensor array.

As discussed above, the different transmitter groups may appear to progress sequentially across the sensor array during the different sub-periods 815-1, 815-2, 815-3, 815-4. For example, each of the transmitter groups 805-9, 805-10, 805-11, 805-12 of the third sub-period 815-3 are shifted down one sensor electrode and shifted right one sensor electrode from the transmitter groups 805-5, 805-6, 805-7, 805-8 of the second sub-period 815-2.

During the third sub-period 815-3, the sensor electrode 120-8 is driven with a modulated signal (shown with hatching) as part of the transmitter group 805-9. A group 835 comprising the sensor electrodes 120-1, 120-2, 120-7 borders the sensor electrode 120-8 and may experience effects from driving the sensor electrode 120-8. Transcapacitive measurements may be acquired using one or more of the sensor electrodes 120-1, 120-2, 120-7 during the third sub-period 815-3. Notably, the sensor electrodes 120-3, 120-13 also border the sensor electrode 120-8 and may be included in the group 835. Transcapacitive measurements may also be acquired using one or more of the sensor electrodes 120-3, 120-13 during the third sub-period 815-3.

By excluding the sensor electrodes 120-3, 120-13 from acquiring transcapacitive measurements during the third sub-period 815-3, a single transcapacitive measurement is acquired for each combination of the sensor electrode 120-8 and the bordering sensor electrodes 120-1, 120-2, 120-3, 120-7, 120-9, 120-13, 120-14, 120-15 during the second period 810. Beneficially, acquiring a single transcapacitive measurement for each combination provides improved sensor array resolution in a shorter sensing period and/or without requiring additional processing to resolve the transcapacitive measurement for particular transcapacitive node(s). Other techniques are also possible, such as acquiring multiple transcapacitive measurements for a particular transcapacitive node, and performing processing to isolate (or normalize) the different transcapacitive measurements. In one non-limiting example, transcapacitive measurements are acquired by the sensor electrode 120-3 during the second sub-period 815-2 and the third sub-period 815-3, and the transcapacitive measurements are averaged to represent the transcapacitive measurement for the transcapacitive node formed between the sensor electrodes 120-8, 120-3.

The diagram 840 illustrates a fourth sub-period 815-4 of the second period 810, during which transcapacitive measurements are acquired. During the fourth sub-period 815-4, the sensor electrodes 120-15, 120-16, 120-21, 120-22 of a transmitter group 805-13 are driven with a modulated signal. As discussed above, the transmitter group 805-13 may be shifted down one sensor electrode and shifted right one sensor electrode from the transmitter group 805-9 of the third sub-period 815-3.

During the fourth sub-period 815-4, the sensor electrode 120-8 is not driven with a modulated signal. The sensor electrode 120-8 borders the sensor electrode 120-15 that is driven as part of the transmitter group 805-13, and a transcapacitive measurement may be acquired during the fourth sub-period 815-4. In some embodiments where a single transcapacitive measurement is acquired for each combination of the sensor electrode 120-8 and the bordering sensor electrodes during the second period 810, the sensor electrode 120-8 may not acquire the transcapacitive measurement during the fourth sub-period 815-4. In other embodiments, the transcapacitive measurement acquired during the fourth sub-period 815-4 is averaged or otherwise combined with the transcapacitive measurement from the other ones of the sub-periods 815-1, 815-2, 815-3 (e.g., the transcapacitive measurement acquired by the sensor electrode 120-15 when the sensor electrode 120-8 is driven during the second sub-period 815-2).

Figure 9:
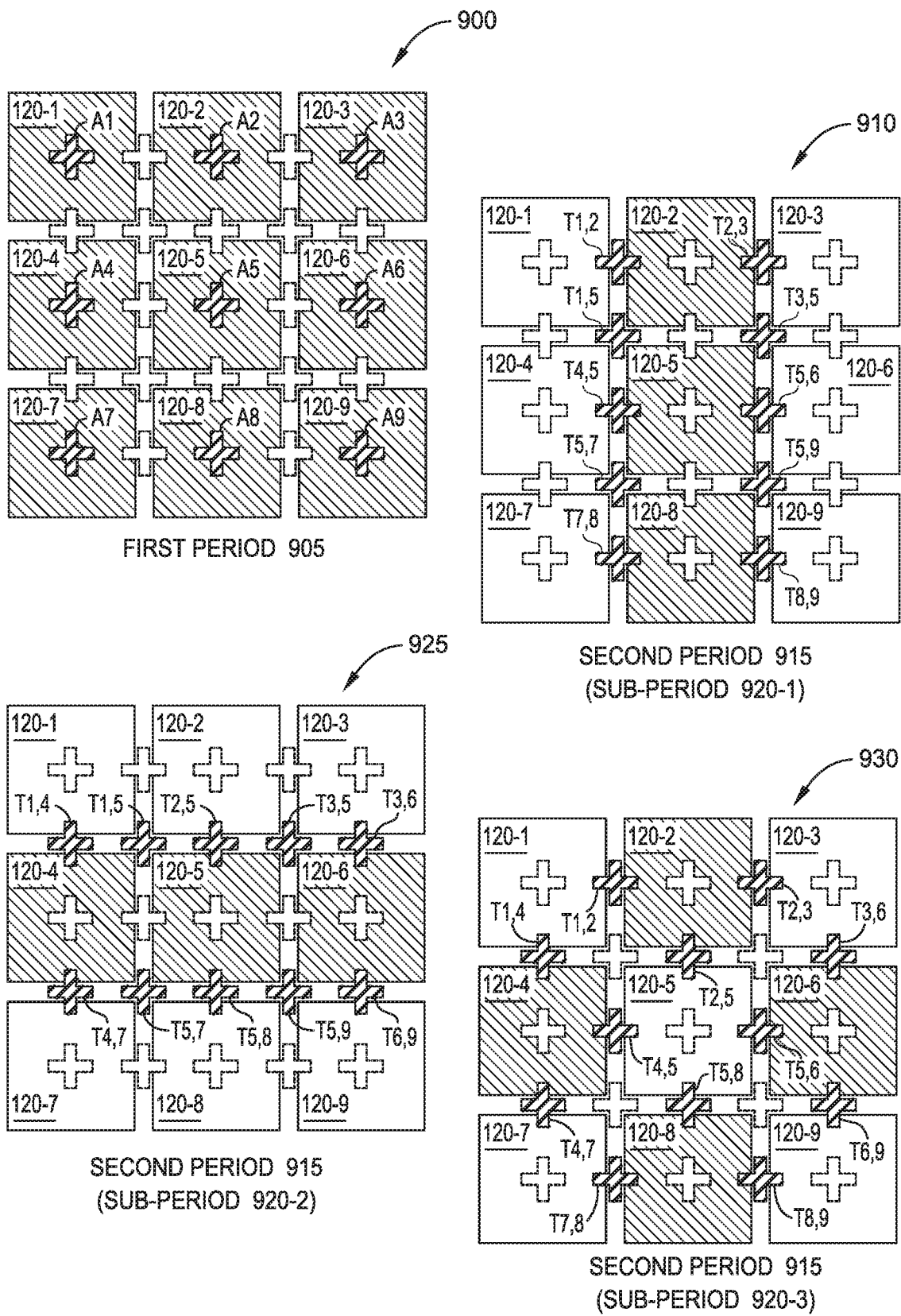

FIG. 9 illustrates an exemplary sequence of performing a scan of a sensor array, according to embodiments described herein. More specifically, diagram 900 illustrates a first period 905 during which absolute capacitive measurements are acquired for the sensor array, and diagrams 910, 925, 930 illustrate three sub-periods 920-1, 920-2, 920-3 of a second period 915 during which different transcapacitive measurements are acquired for the sensor array. The features illustrated in the sequence of FIG. 9 may be used in conjunction with other embodiments described herein. As shown, the sensor array comprises nine sensor electrodes 120-1, 120-2, . . . , 120-9 arranged in a rectangular 3×3 arrangement, although other numbers and arrangements of sensor electrodes are also possible.

The diagram 900 illustrates operation of the sensor array during a first period 705. During the first period 905, absolute capacitive measurements are acquired for each of the plurality of sensor electrodes 120-1, 120-2, . . . , 120-9. In some embodiments, all of the sensor electrodes 120-1, 120-2, . . . , 120-9 are driven with a modulated signal (shown as light hatching), and absolute capacitive measurements corresponding to the absolute capacitive nodes A1, . . . , A9 (shown with heavy hatching) are acquired. In some embodiments, the sensor electrodes 120-1, 120-2, . . . , 120-9 are driven contemporaneously (e.g., partly or fully overlapping in time). The absolute capacitive measurements may be acquired separately or contemporaneously.

A scan of the sensor array may generally be represented in the form $$S = \begin{pmatrix} A1 & T1,2 & A2 & T2,3 & A3 \\ T1,4 & T1,5 & T2,5 & T3,5 & T3,6 \\ A4 & T4,5 & A5 & T5,6 & A6 \\ T4,7 & T5,7 & T5,8 & T5,9 & T6,9 \\ A7 & T7,8 & A8 & T8,9 & A9 \end{pmatrix}, \quad (1)$$

where A1, A2, . . . , A9 represent capacitive measurements acquired at the particular absolute capacitive node, and T1,2, T2,3, . . . , T8,9 represent transcapacitive measurements acquired at the particular transcapacitive node. Notably, the transcapacitive measurements reflected in the sensor array scan S may result from performing decoding operations of the capacitive measurements acquired by the individual sensor electrodes 120-1, 120-2, . . . , 120-9. Thus, the capacitive measurements acquired during the first period 905 may be represented as:

$$A = \begin{pmatrix} A1 & A2 & A3 \\ A4 & A5 & A6 \\ A7 & A8 & A9 \end{pmatrix}. \quad (2)$$

The diagram 910 illustrates operation of the sensor array during the first sub-period 920-1 of the second period 915. During the second period 915, one or more transcapacitive measurements are acquired for each of the transcapacitive sensing nodes T1,2, T2,3, . . . , T8,9. The transcapacitive measurements acquired during the second period 915 may be "undecoded" measurements representing a linear combination of multiple sensing nodes.

During the first sub-period 920-1, the sensor electrodes 120-2, 120-5, 120-8 are driven with a modulated signal, and transcapacitive measurements are acquired corresponding to the transcapacitive nodes T1,2, T2,3, T1,5, T3,5, T4,5, T5,6, T5,7, T5,9, T7,8, T8,9. The transcapacitive measurements reflect effects of driving the sensor electrodes 120-2, 120-5, 120-8 on the (bordering) sensor electrodes 120-1, 120-3, 120-4, 120-6, 120-7, 120-9. The transcapacitive measurements may be acquired separately or contemporaneously. Thus, the capacitive measurements acquired by the plurality of sensor electrodes 120-1, 120-2, . . . , 120-9 during the first sub-period 920-1 may be represented as:

$$Th = \begin{pmatrix} (T1, 2 + T1, 5) & 0 & (T2, 3 + T3, 5) \\ (T1, 5 + T4, 5 + T5, 7) & 0 & (T3, 5 + T5, 6 + T5, 9) \\ (T5, 7 + T7, 8) & 0 & (T5, 9 + T8, 9) \end{pmatrix}. \quad (3)$$

The diagram 925 illustrates operation of the sensor array during the second sub-period 920-2 of the second period 915. During the second sub-period 920-2, the sensor electrodes 120-4, 120-5, 120-6 are driven with a modulated signal, and transcapacitive measurements are acquired corresponding to the transcapacitive nodes T1,4, T1,5, T2,5, T3,5, T3,6, T4,7, T5,7, T5,8, T5,9, T6,9. The transcapacitive measurements reflect effects of driving the sensor electrodes 120-4, 120-5, 120-6 on the (bordering) sensor electrodes 120-1, 120-2, 120-3, 120-7, 120-8, 120-9. The transcapacitive measurements may be acquired separately or contemporaneously. Thus, the capacitive measurements acquired during the second sub-period 920-2 may be represented as:

$$Tv = \begin{pmatrix} (T1, 4 + T1, 5) & (T1, 5 + T2, 5 + T3, 5) & (T3, 5 + T3, 6) \\ 0 & 0 & 0 \\ (T4, 7 + T5, 7) & (T5, 7 + T5, 8 + T5, 9) & (T5, 9 + T6, 9) \end{pmatrix}. \quad (4)$$

The diagram 930 illustrates operation of the sensor array during the third sub-period 920-3 of the second period 915. During the third sub-period 920-3, the sensor electrodes 120-2, 120-4, 120-6, 120-8 are driven with a modulated signal, and transcapacitive measurements are acquired corresponding to the transcapacitive nodes T1,2, T2,3, T1,4, T2,5, T3,6, T4,5, T5,6, T4,7, T5,8, T6,9, T7,8, T8,9. The transcapacitive measurements reflect effects of driving the sensor electrodes 120-2, 120-4 120-6, 120-8 on the (bordering) sensor electrodes 120-1, 120-3, 120-5, 120-7, 120-9. The transcapacitive measurements may be acquired separately or contemporaneously. Thus, the capacitive measurements acquired during the third sub-period 920-3 may be represented as:

$$Td = \begin{pmatrix} (T1, 2 + T1, 4) & 0 & (T2, 3 + T3, 6) \\ 0 & (T2, 5 + T4, 5 + T5, 6 + T5, 8) & 0 \\ (T4, 7 + T7, 8) & 0 & (T6, 9 + T8, 9) \end{pmatrix}. \quad (5)$$

According to the exemplary sequence illustrated in FIG. 9, first sensor electrodes 120-2, 120-5, 120-8 are driven with a modulated signal during the first sub-period 920-1 of the second period 915. The first sensor electrodes 120-2, 120-5, 120-8 are contiguous along a first axis of the sensor array. Second sensor electrodes 120-4, 120-5, 120-6 are driven with a modulated signal during the second sub-period 920-2 of the second period 915. The second sensor electrodes 120-4, 120-5, 120-6 are contiguous along a second axis of the sensor array. Third sensor electrodes 120-2, 120-4, 120-6, 120-8 are driven with a modulated signal during the third sub-periods 920-3 of the second period 915. The third sensor electrodes 120-2, 120-4, 120-6, 120-8 comprise alternating sensor electrodes of the sensor array.

One or more matrix operations may be performed on the capacitive measurements Th, Tv, Td acquired during the different sub-periods 920-1, 920-2, 920-3 to acquire the transcapacitive measurement for each combination of a sensor electrode and a bordering sensor electrode. Stated another way, the one or more matrix operations may be used to isolate the effects for each combination of a sensor electrode and a bordering sensor electrode. In some embodiments, the one or more matrix operations comprise at least one of matrix addition or matrix subtraction.

Using the exemplary sequence illustrated in FIG. 9, the capacitive measurements Th, Tv, Td may be combined in different ways to acquire the transcapacitive measurements for each transcapacitive node:

$$Th + Tv - Td = \begin{pmatrix} 2(T1, 5) & (T1, 5 + T2, 5 + T3, 5) & 2(T3, 5) \\ (T1, 5 + T4, 5 + T5, 7) & -(T2, 5 + T4, 5 + T5, 6 + T5, 8) & (T3, 5 + T5, 6 + T5, 9) \\ 2(T5, 7) & (T5, 7 + T5, 8 + T5, 9) & 2(T5, 9) \end{pmatrix}, \quad (6)$$

$$Tv + Td - Th = \begin{pmatrix} 2(T1, 4) & (T1, 5 + T2, 5 + T3, 5) & 2(T3, 6) \\ -(T1, 5 + T4, 5 + T5, 7) & (T2, 5 + T4, 5 + T5, 6 + T5, 8) & -(T3, 5 + T5, 6 + T5, 9) \\ 2(T4, 7) & (T5, 7 + T5, 8 + T5, 9) & 2(T6, 9) \end{pmatrix}, \quad (7)$$

$$Th + Td - Tv = \begin{pmatrix} 2(T1, 2) & -(T1, 5 + T2, 5 + T3, 5) & 2(T2, 3) \\ (T1, 5 + T4, 5 + T5, 7) & (T2, 5 + T4, 5 + T5, 6 + T5, 8) & (T3, 5 + T5, 6 + T5, 9) \\ 2(T7, 8) & -(T5, 7 + T5, 8 + T5, 9) & 2(T8, 9) \end{pmatrix}. \quad (8)$$

Each of the combinations may be scaled (e.g., normalized) or further processed. For example, transcapacitive measurements for the transcapacitive nodes T1,2, T2,3, T1,4, T1,5, T3,5, T3,6, T4,7, T5,7, T5,9, T6,9, T7,8, and T8,9 are isolated using Equations (6), (7), and (8). Transcapacitive measurements for the transcapacitive nodes T2,5, T4,5, T5,6, T5,8 may be derived from transcapacitive measurements for the other transcapacitive nodes. For example, a transcapacitive measurement for the transcapacitive node T4,5 may be obtained by subtracting the transcapacitive measurements T1,5 and T5,7 from the measurement (T1,5+T4,5+T5,7) of Th. Other scan sequences and mathematical combinations and calculations of the capacitive measurements are also possible.

Beneficially, according to the sequence, the transcapacitive measurements for the sensor array depicted in FIG. 9 may be completed in three sub-periods, and using relatively simple matrix operations. In this way, completing the scan of the sensor array may require less processing, allowing quicker completion of sensing, reduced power consumption, etc.

Figure 10:
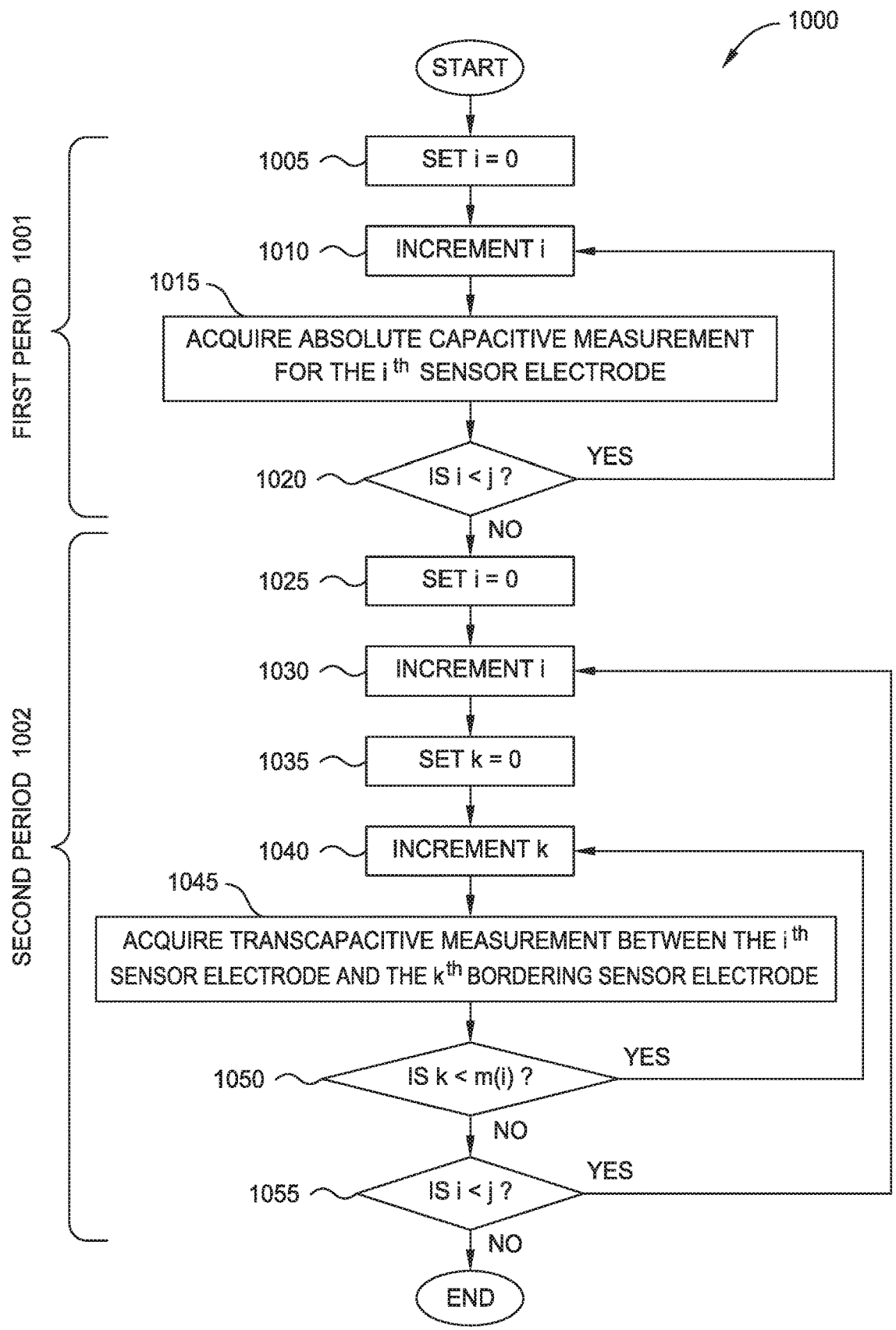
FIG. 10 illustrates a method of performing a scan of a sensor array, according to embodiments described herein.

FIG. 10 illustrates a method 1000 of performing a scan of a sensor array, according to embodiments described herein. The features described with respect to the method 1000 may be used in conjunction with other embodiments described herein. In one non-limiting example, the method 1000 may be performed by the sensor module 210 of FIG. 3 in conjunction with one of the sensor arrays depicted in FIGS. 4, 5, 6.

Method 1000 begins at block 1005, where a counter value i is set to zero. The counter value i represents an index value for the sensor electrodes of the sensor array. At block 1010, the counter value i is incremented. At block 1015, the sensor module acquires an absolute capacitive measurement for the $i^{th}$ sensor electrode.

At block 1020, the sensor module determines whether the counter value i is less than a value j (that is, i<j) representing the number of sensor electrodes of the sensor array. If the counter value l is less than the value j ("YES"), the method 1000 returns to block 1010. If the counter value i equals (or exceeds) the value j ("NO"), absolute capacitive measurements have been acquired for all of the sensor electrodes, and the method 1000 proceeds to block 1025. The blocks 1005 through proceeding to block 1025 may be represented as occurring within a first period 1001. In some alternate embodiments, absolute capacitive measurements for more than one of the sensor electrodes are acquired simultaneously. In some alternate embodiments, the absolute capacitive measurements are acquired according to a different sequence.

At block 1025, the counter value i is set to zero. At block 1030, the counter value i is incremented. At block 1035, a counter value k is set to zero. The counter value k represents an index value for the number of sensor electrodes that border a particular sensor electrode. At block 1040, the counter value k is incremented. At block 1045, the sensor module acquires a transcapacitive measurement between the $i^{th}$ sensor electrode and the $k^{th}$ bordering sensor electrode.

At block 1050, the sensor module determines whether the counter value k is less than a value m(i), where m(i) represents the number of bordering sensor electrodes for the $i^{th}$ sensor electrode. If the counter value k is less than m(i) ("YES"), the method 1000 returns to block 1040. If the counter value k equals (or exceeds) m(i) ("NO"), transcapacitive measurements have been acquired for all of the bordering sensor electrodes for the $i^{th}$ sensor electrode, and the method 1000 proceeds to block 1055.

At block 1055, the sensor module determines whether the counter value i is less than the value j. If the counter value i is less than the value j ("YES"), the method 1000 returns to block 1030. If the counter value i equals (or exceeds) the value j ("NO"), transcapacitive measurements have been acquired for all of the bordering sensor electrodes for all of the sensor electrodes, and the method 1000 ends following completion of the block 1055. Blocks 1025 through the completion of block 1055 may be represented as occurring within a second period 1002. In some alternate embodiments, multiple transcapacitive measurements are acquired simultaneously. In some alternate embodiments, the transcapacitive measurements are acquired according to a different sequence.

Thus, the embodiments and examples set forth herein were presented in order to best explain the embodiments in accordance with the present technology and its particular application and to thereby enable those skilled in the art to make and use the disclosure. However, those skilled in the art will recognize that the foregoing description and examples have been presented for the purposes of illustration and example only. The description as set forth is not intended to be exhaustive or to limit the disclosure to the precise form disclosed.

In view of the foregoing, the scope of the present disclosure is determined by the claims that follow.

What is claimed is:

1. An input device comprising:
    a sensor array comprising a plurality of sensor electrodes in a single layer of the input device, wherein each sensor electrode of the plurality of sensor electrodes is bordered by one or more bordering sensor electrodes of the plurality of sensor electrodes;
    a plurality of routing traces arranged in the single layer; and
    a processing system coupled with the plurality of sensor electrodes via the plurality of routing traces, the processing system configured to perform a scan of the sensor array by operating each sensor electrode of the plurality of sensor electrodes to:
        acquire, during a first period, an absolute capacitive measurement for the sensor electrode;
        for each bordering sensor electrode of the one or more bordering sensor electrodes:
            acquire, during a second period, a transcapacitive measurement between the sensor electrode and the bordering sensor electrode; and
        according to a predefined sequence:
            drive a first plurality of transmitter groups with a modulated signal during a first sub-period of the second period, wherein each transmitter group of the first plurality of transmitter groups comprises a plurality of contiguous sensor electrodes of the plurality of sensor electrodes and is spaced apart from other transmitter groups of the first plurality of transmitter groups; and
            drive a second plurality of transmitter groups with a modulated signal during a second sub-period of the second period, wherein each transmitter group of the second plurality of transmitter groups comprises a plurality of contiguous sensor electrodes of the plurality of sensor electrodes and is spaced apart from other transmitter groups of the second plurality of transmitter groups.

2. The input device of claim 1, wherein according to the predefined sequence, a single transcapacitive measurement is acquired for each combination of a particular sensor electrode and a bordering sensor electrode of the one or more bordering sensor electrodes.

3. The input device of claim 1, wherein the plurality of contiguous sensor electrodes of each transmitter group of the first plurality of transmitter groups and of each transmitter group of the second plurality of transmitter groups comprises:
    two sensor electrodes that are contiguous along a first axis of the sensor array; and
    two sensor electrodes that are contiguous along a second axis of the sensor array.

4. The input device of claim 3, wherein, within the first plurality of transmitter groups and within the second plurality of transmitter groups, different transmitter groups are separated by two sensor electrodes along the first axis and by two sensor electrodes along the second axis.

5. The input device of claim 1, wherein during the first period, the plurality of sensor electrodes is contemporaneously driven with a same modulated signal.

6. The input device of claim 1, wherein the sensor array comprises a rectangular array of M rows of sensor electrodes and N columns of sensor electrodes.

7. An input device comprising:
a sensor array comprising a plurality of sensor electrodes in a single layer of the input device, wherein each sensor electrode of the plurality of sensor electrodes is bordered by one or more bordering sensor electrodes of the plurality of sensor electrodes;
a plurality of routing traces arranged in the single layer; and
a processing system coupled with the plurality of sensor electrodes via the plurality of routing traces, the processing system configured to perform a scan of the sensor array by operating each sensor electrode of the plurality of sensor electrodes to:
acquire, during a first period, an absolute capacitive measurement for the sensor electrode;
for each bordering sensor electrode of the one or more bordering sensor electrodes:
acquire, during a second period, a transcapacitive measurement between the sensor electrode and the bordering sensor electrode; and
according to a predefined sequence:
drive first sensor electrodes of the plurality of sensor electrodes with a modulated signal during a first sub-period of the second period;
drive second sensor electrodes of the plurality of sensor electrodes with a modulated signal during a second sub-period of the second period; and
perform one or more matrix operations to acquire the transcapacitive measurement between the sensor electrode and the bordering sensor electrode.

8. The input device of claim 7, wherein the processing system is further configured to, according to the predefined sequence:
drive third sensor electrodes of the plurality of sensor electrodes with a modulated signal during a third sub-period of the second period,
wherein the first sensor electrodes are contiguous along a first axis of the sensor array,
wherein the second sensor electrodes are contiguous along a second axis of the sensor array,
wherein the third sensor electrodes comprise alternating sensor electrodes of the sensor array, and
wherein the one or more matrix operations comprise at least one of matrix addition or matrix subtraction.

9. A processing system comprising:
sensing circuitry configured to:
couple with a sensor array via a plurality of routing traces, wherein the sensor array comprises a plurality of sensor electrodes in a single layer, wherein each sensor electrode of the plurality of sensor electrodes is bordered by one or more bordering sensor electrodes of the plurality of sensor electrodes, wherein the plurality of routing traces is arranged in the single layer;
perform a scan of the sensor array by operating each sensor electrode of the plurality of sensor electrodes to:
acquire, during a first period, an absolute capacitive measurement for the sensor electrode; and
for each bordering sensor electrode of the one or more bordering sensor electrodes:
acquire, during a second period, a transcapacitive measurement between the sensor electrode and the bordering sensor electrode; and
according to a predefined sequence:
drive a first plurality of transmitter groups with a modulated signal during a first sub-period of the second period, wherein each transmitter group of the first plurality of transmitter groups comprises a plurality of contiguous sensor electrodes of the plurality of sensor electrodes and is spaced apart from other transmitter groups of the first plurality of transmitter groups; and
drive a second plurality of transmitter groups with a modulated signal during a second sub-period of the second period, wherein each transmitter group of the second plurality of transmitter groups comprises a plurality of contiguous sensor electrodes of the plurality of sensor electrodes and is spaced apart from other transmitter groups of the second plurality of transmitter groups.

10. The processing system of claim 9, wherein according to the predefined sequence, a single transcapacitive measurement is acquired for each combination of a particular sensor electrode and a bordering sensor electrode of the one or more bordering sensor electrodes.

11. The processing system of claim 9, wherein during the first period, the plurality of sensor electrodes is contemporaneously driven with a same modulated signal.

12. The processing system of claim 9, wherein the sensor array and the plurality of routing traces are arranged in the single layer of an input device, wherein the input device further comprises a display device, the processing system further comprising:
display driver circuitry configured to update the display device.

13. The processing system of claim 12, wherein each of the plurality of sensor electrodes comprises at least one common electrode of a plurality of common electrodes of the display device, wherein the plurality of common electrodes are configured to perform capacitive sensing and display updating.

14. A processing system comprising:
sensing circuitry configured to:
couple with a sensor array via a plurality of routing traces, wherein the sensor array comprises a plurality of sensor electrodes in a single layer, wherein each sensor electrode of the plurality of sensor electrodes is bordered by one or more bordering sensor electrodes of the plurality of sensor electrodes, wherein the plurality of routing traces is arranged in the single layer;
perform a scan of the sensor array by operating each sensor electrode of the plurality of sensor electrodes to:
acquire, during a first period, an absolute capacitive measurement for the sensor electrode; and
for each bordering sensor electrode of the one or more bordering sensor electrodes:
acquire, during a second period, a transcapacitive measurement between the sensor electrode and the bordering sensor electrode; and
according to a predefined sequence:
drive first sensor electrodes of the plurality of sensor electrodes with a modulated signal during a first sub-period of the second period;

drive second sensor electrodes of the plurality of sensor electrodes with a modulated signal during a second sub-period of the second period; and perform one or more matrix operations to acquire the transcapacitive measurement between the sensor electrode and the bordering sensor electrode.

15. The processing system of claim 14, wherein the sensing circuitry is further configured to, according to the predefined sequence:

drive third sensor electrodes of the plurality of sensor electrodes with a modulated signal during a third sub-period of the second period, wherein the first sensor electrodes are contiguous along a first axis of the sensor array, wherein the second sensor electrodes are contiguous along a second axis of the sensor array, wherein the third sensor electrodes comprise alternating sensor electrodes of the sensor array, and wherein the one or more matrix operations comprise at least one of matrix addition or matrix subtraction.

16. A method of performing a scan of a sensor array of an input device, the sensor array comprising a plurality of sensor electrodes in a single layer of the input device, the input device further comprising a plurality of routing traces arranged in the single layer, the method comprising:

for each sensor electrode of the plurality of sensor electrodes:

acquiring, during a first period, an absolute capacitive measurement for the sensor electrode; and for each bordering sensor electrode of one or more bordering sensor electrodes of the plurality of sensor electrodes:

acquiring, during a second period, a transcapacitive measurement between the sensor electrode and the bordering sensor electrode;

wherein acquiring the transcapacitive measurement comprises, according to a predefined sequence:

driving a first plurality of transmitter groups with a modulated signal during a first sub-period of the second period, wherein each transmitter group of the first plurality of transmitter groups comprises a plurality of contiguous sensor electrodes of the plurality of sensor electrodes and is spaced apart from other transmitter groups of the first plurality of transmitter groups; and driving a second plurality of transmitter groups with a modulated signal during a second sub-period of the second period, wherein each transmitter group of the second plurality of transmitter groups comprises a plurality of contiguous sensor electrodes of the plurality of sensor electrodes and is spaced apart from other transmitter groups of the second plurality of transmitter groups.

17. A method of performing a scan of a sensor array of an input device, the sensor array comprising a plurality of sensor electrodes in a single layer of the input device, the input device further comprising a plurality of routing traces arranged in the single layer, the method comprising:

for each sensor electrode of the plurality of sensor electrodes:

acquiring, during a first period, an absolute capacitive measurement for the sensor electrode; and for each bordering sensor electrode of one or more bordering sensor electrodes of the plurality of sensor electrodes:

acquiring, during a second period, a transcapacitive measurement between the sensor electrode and the bordering sensor electrode, wherein acquiring the transcapacitive measurement comprises, according to a predefined sequence:

driving first sensor electrodes of the plurality of sensor electrodes with a modulated signal during a first sub-period of the second period;

driving second sensor electrodes of the plurality of sensor electrodes with a modulated signal during a second sub-period of the second period; and performing one or more matrix operations to acquire the transcapacitive measurement between the sensor electrode and the bordering sensor electrode.

* * * * *